United States Patent [19]
Nomura et al.

[11] Patent Number: 6,014,354
[45] Date of Patent: Jan. 11, 2000

[54] TRACKING CONTROL DEVICE FOR OPTICAL PICKUP

[75] Inventors: Masaru Nomura, Tenri; Takeshi Yamaguchi, Sakai, both of Japan

[73] Assignee: Sharp Kabushiki Kaisha, Osaka, Japan

[21] Appl. No.: 08/963,473

[22] Filed: Nov. 3, 1997

[30] Foreign Application Priority Data

Nov. 6, 1996 [JP] Japan ..................................... 8-293715
Nov. 27, 1996 [JP] Japan ..................................... 8-315770

[51] Int. Cl.$^7$ ....................................................... G11B 7/00
[52] U.S. Cl. .......................................................... 369/44.28
[58] Field of Search .............................. 369/44.41, 44.42, 369/44.28, 44.26, 44.32, 32, 124, 44.34

[56] References Cited

U.S. PATENT DOCUMENTS

| | | | |
|---|---|---|---|
| 4,512,002 | 4/1985 | Kosaka et al. | 369/44.25 |
| 4,544,838 | 10/1985 | Musha et al. | 369/44.41 |
| 4,545,003 | 10/1985 | Hirano et al. | 369/44.32 |
| 5,206,848 | 4/1993 | Kusano et al. | 369/44.32 |
| 5,258,968 | 11/1993 | Matsuda et al. | 369/44.32 |
| 5,444,682 | 8/1995 | Yamada et al. | 369/44.26 |
| 5,644,560 | 7/1997 | Hori | 369/44.35 |
| 5,808,979 | 9/1998 | Ishibashi et al. | 369/44.35 |

FOREIGN PATENT DOCUMENTS 62-073433A 4/1987 Japan.

*Primary Examiner*—Nabil Hindi
*Attorney, Agent, or Firm*—David G. Conlin; Richard E. Gamache

[57] ABSTRACT

A farfield pattern which occurs when a light spot passes through a pit on a disk is applied as two-phase pulses to a pulse issuing portion through photo detectors, current-voltage converters and binarizing circuits. The pulse issuing portion issues, to a difference detector, pulses corresponding to the two-phase pulses, respectively, and each having a time width starting from the time point of level change of one of the two-phase pulses and terminating at earlier one between the time point of return of the one pulse to the initial level and the time point of change in the other binary signal and the time point of level change of the other pulse. The difference detector applies a phase difference pulse corresponding to the two pulses applied thereto to a LPF. The phase difference pulse converted into an analog signal by the LPF is issued as a tracking error signal. Therefore, when a glitch is mixed into the output signal of the photo detectors, the width of the pulse issued from pulse issuing portion increases only correspondingly to the glitch, and an influence on the tracking error signal by the glitch is suppressed to be minimum, so that stable tracking servo-control is achieved.

14 Claims, 32 Drawing Sheets

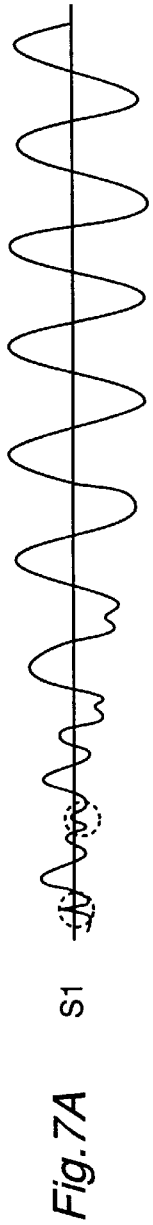
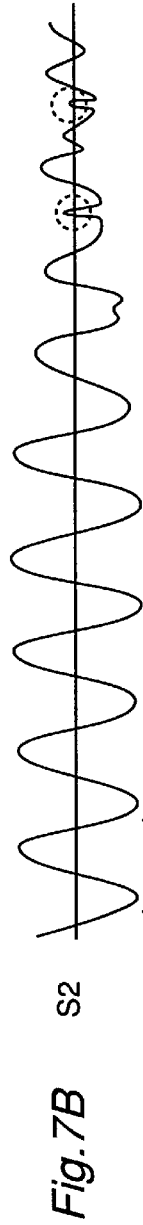
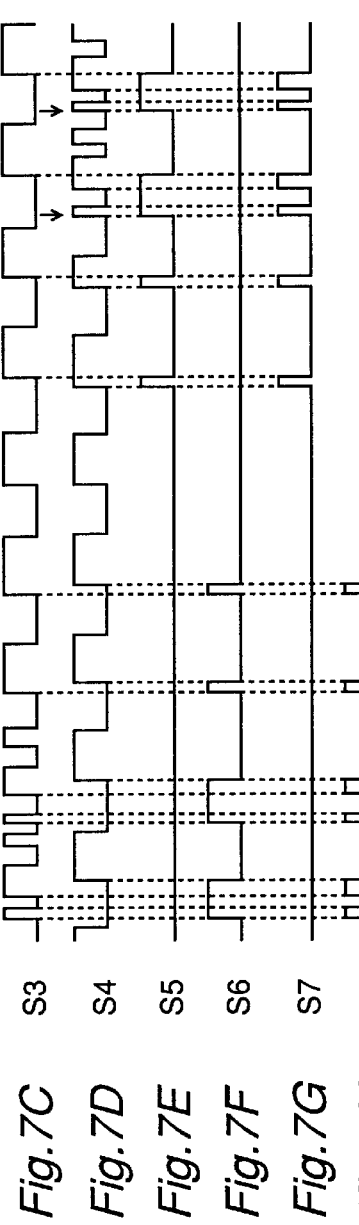
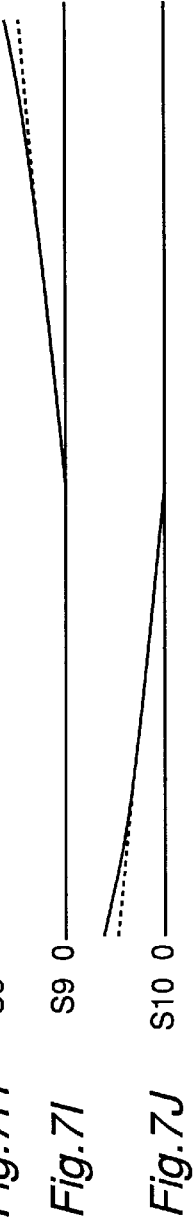
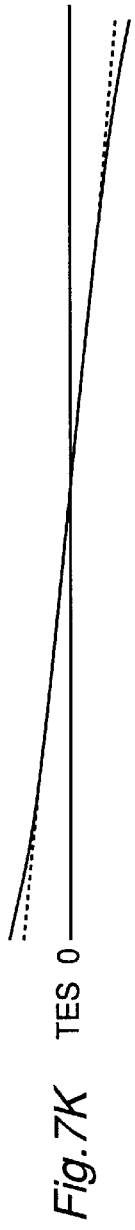

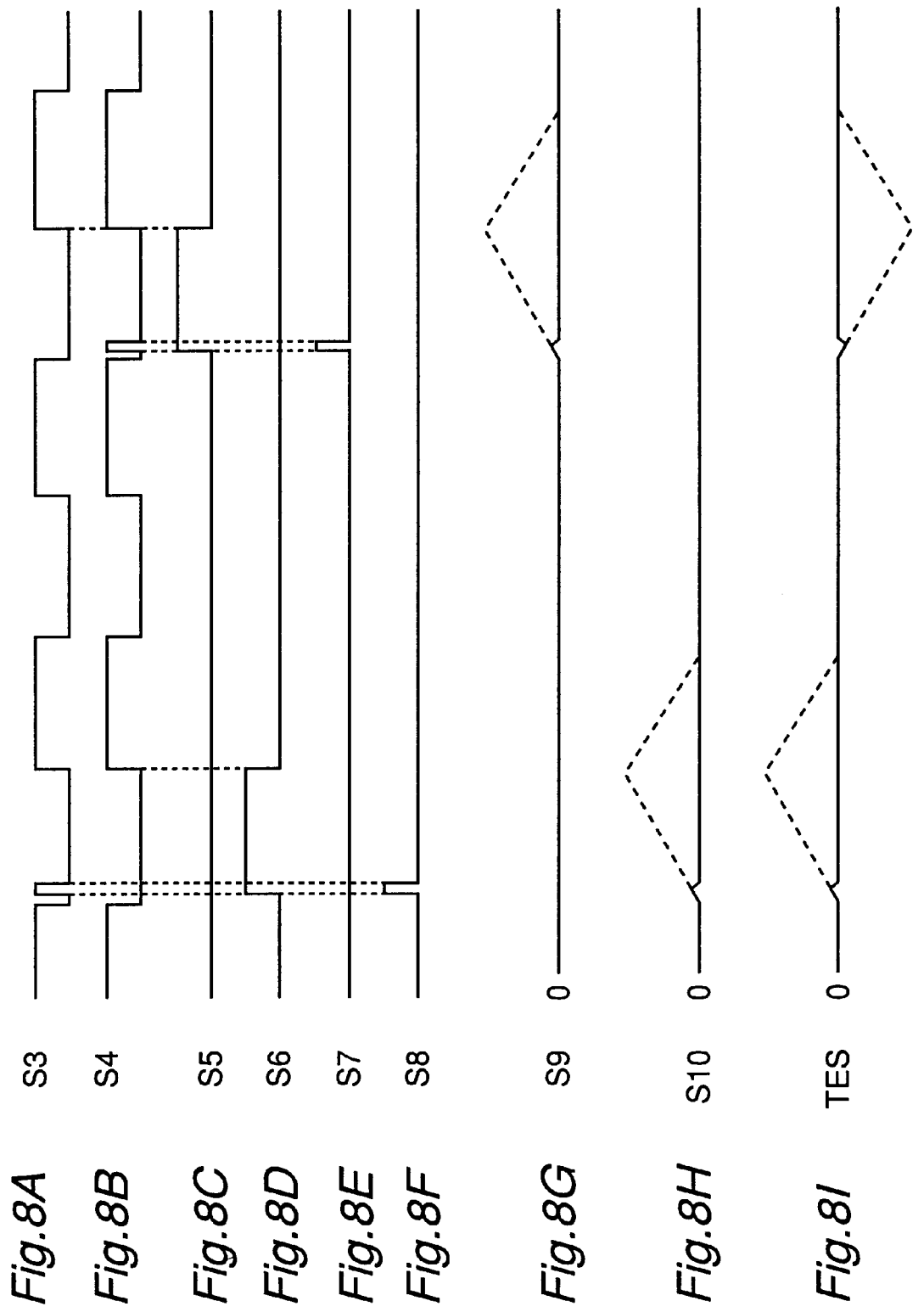

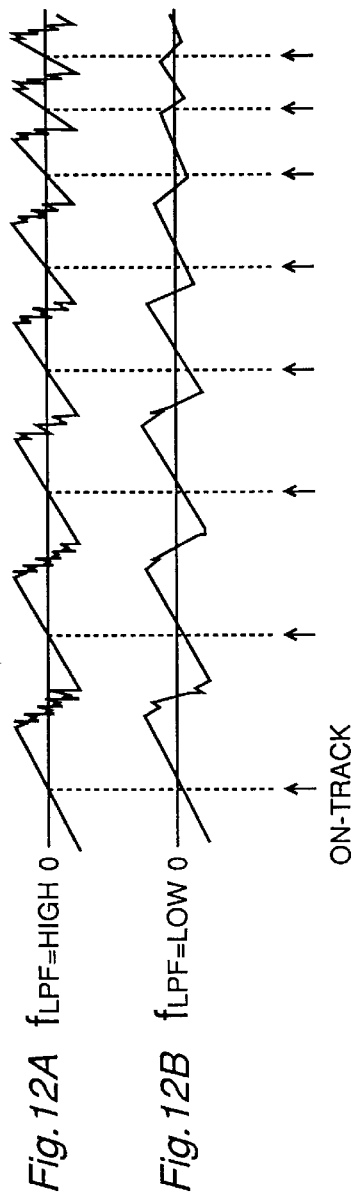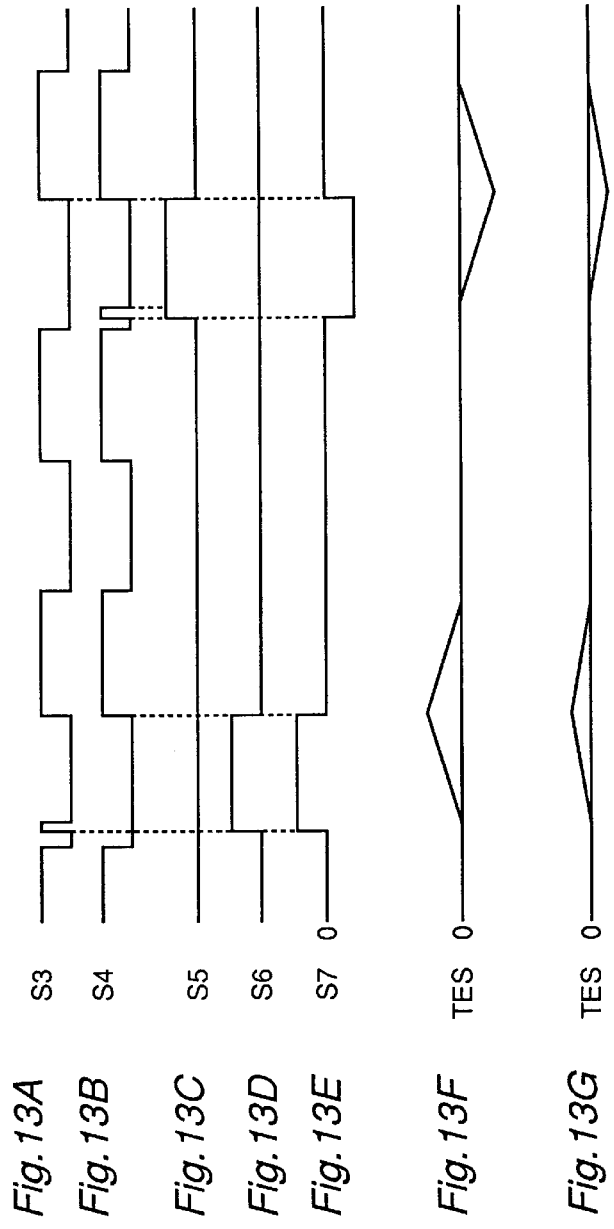

*Fig.26A* *Fig.26B*
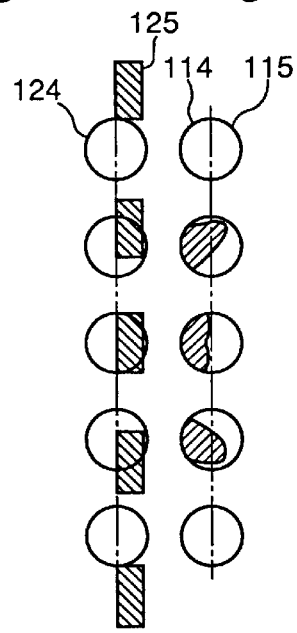
*Fig.27* PRIOR ART
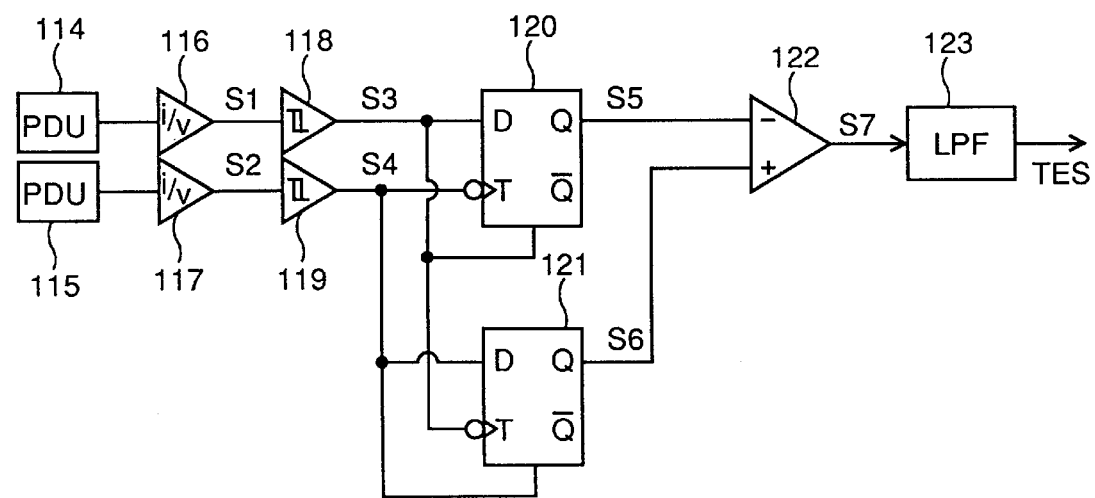

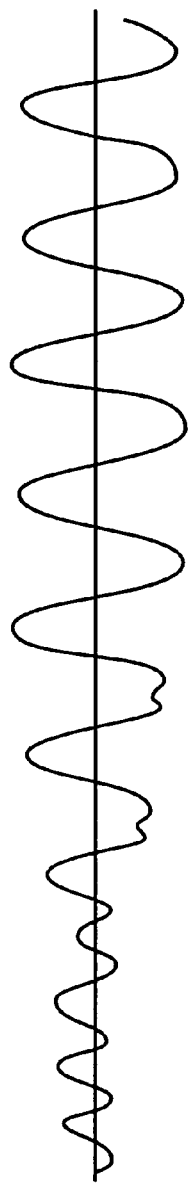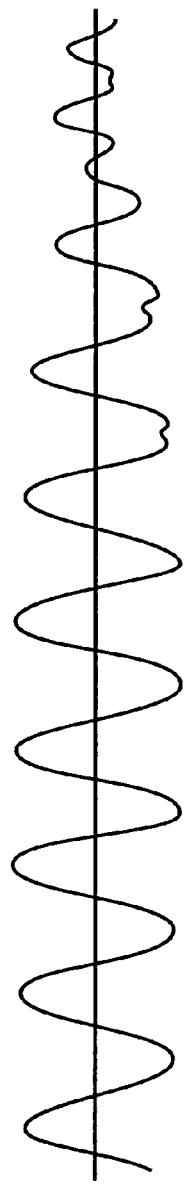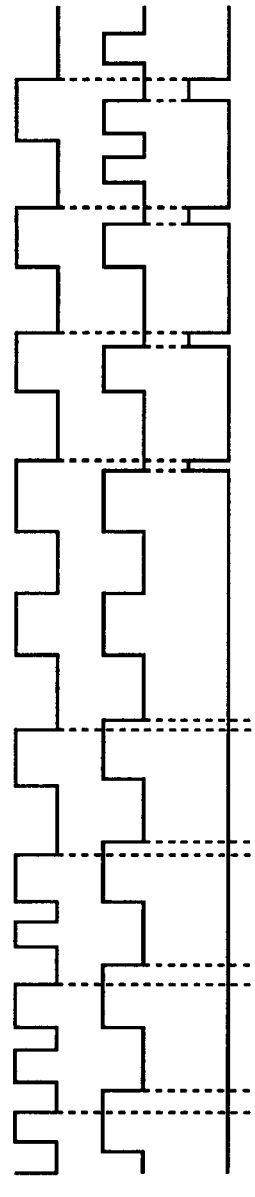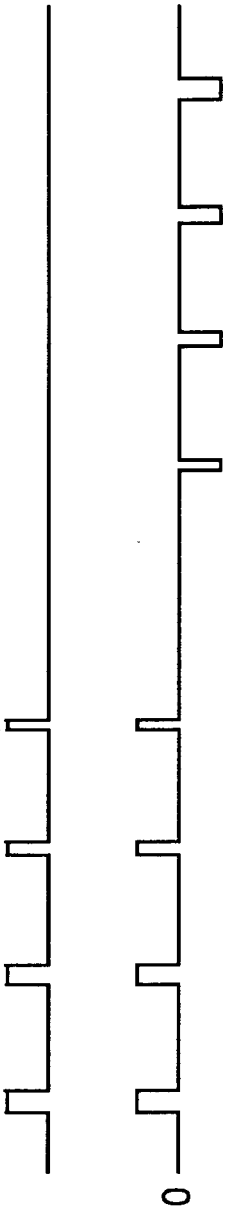
Fig.28A S1
Fig.28B S2
Fig.28C S3
Fig.28D S4
Fig.28E S5
Fig.28F S6
Fig.28G S7 0
Fig.28H TES 0

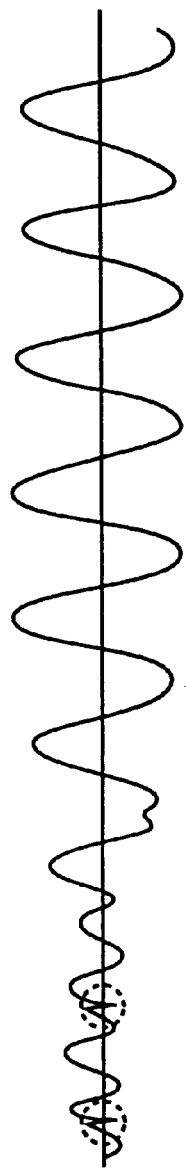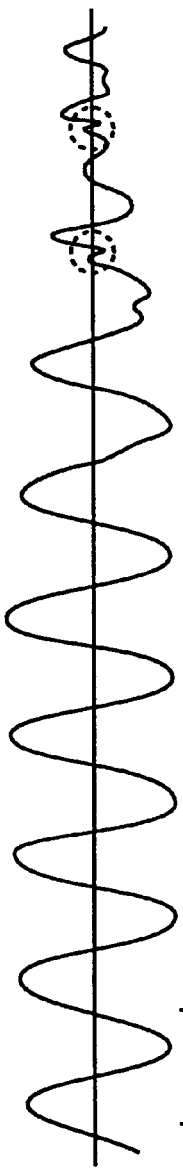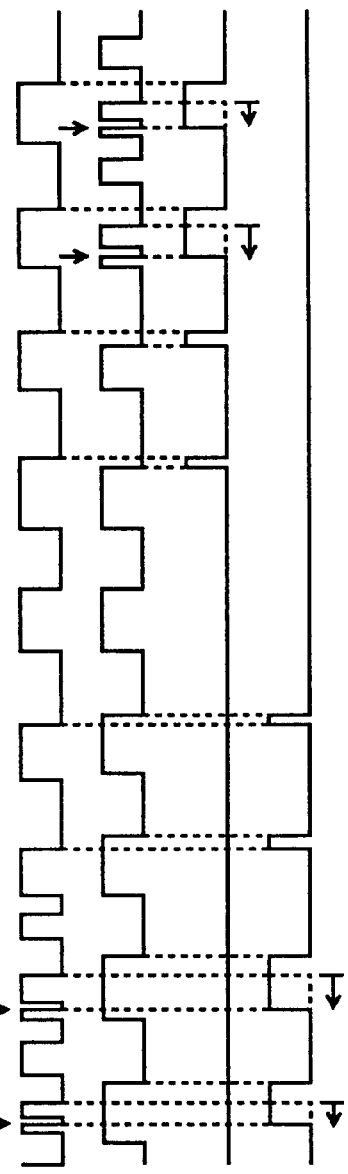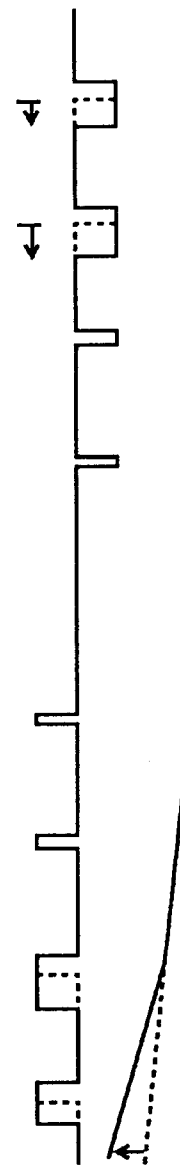
Fig.29A  S1
Fig.29B  S2
Fig.29C  S3
Fig.29D  S4
Fig.29E  S5
Fig.29F  S6
Fig.29G  S7
Fig.29H  TES

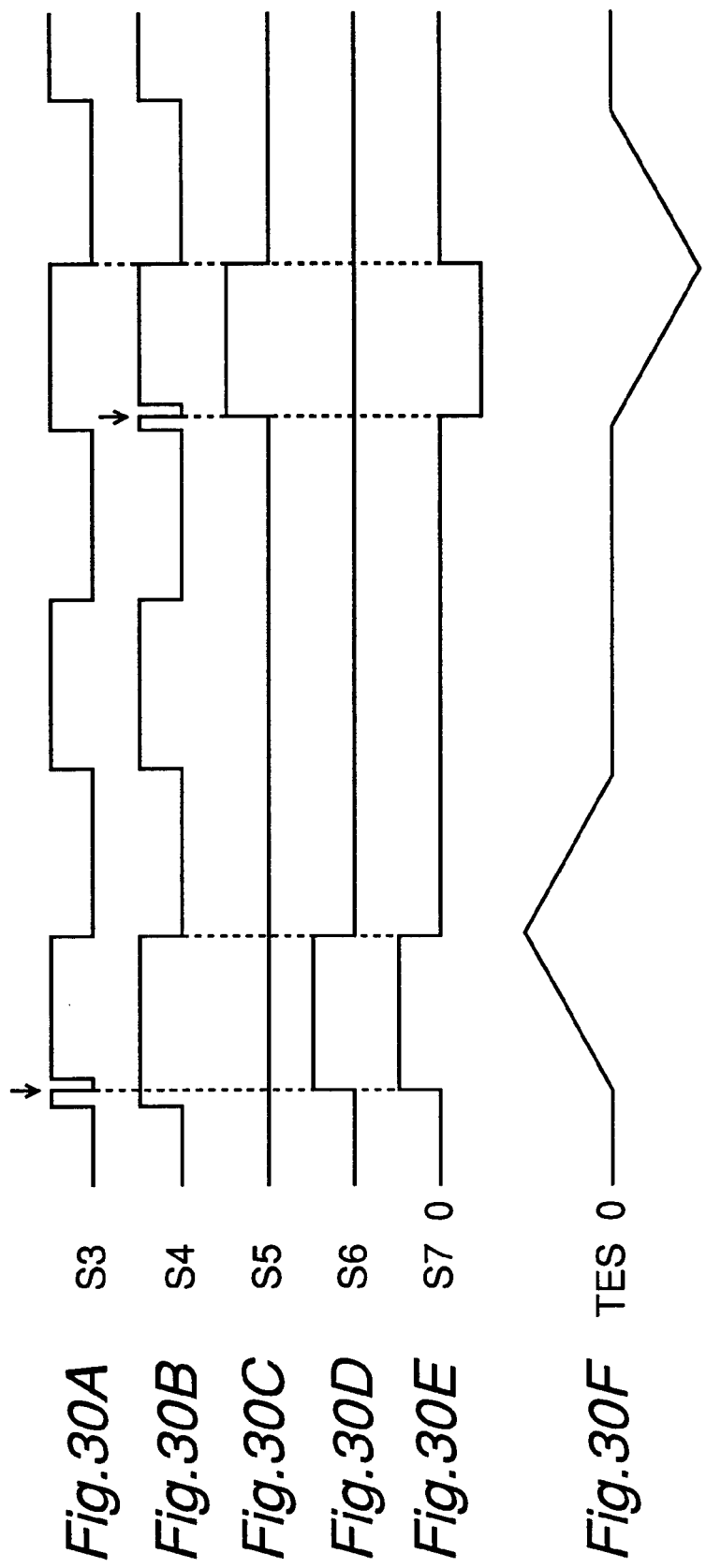

ON-TRACK
(INFORMATION PIT ROW)

DRIVING DIRECTION
OF LIGHT SPOT 124

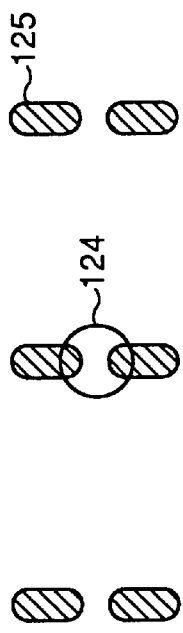
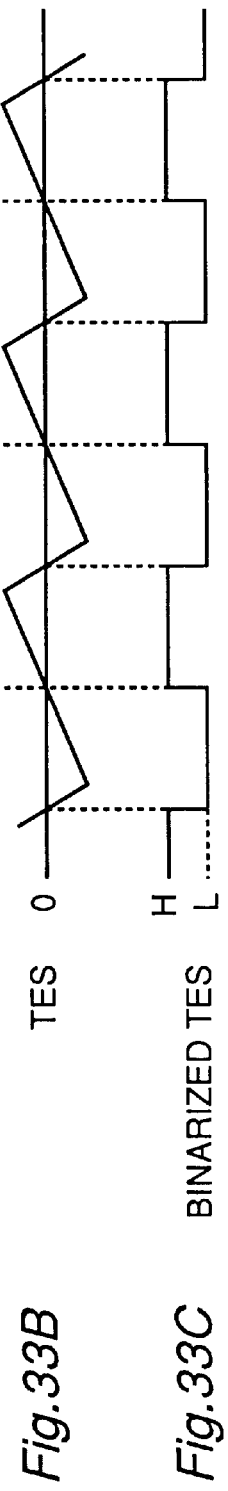
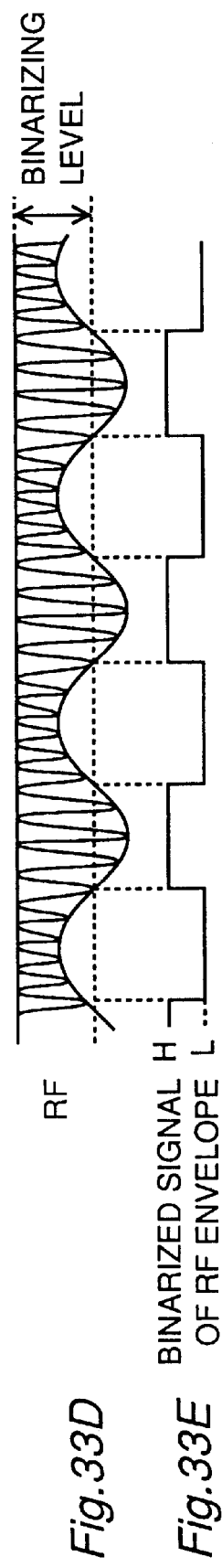
Fig.33A
Fig.33B
Fig.33C
Fig.33D
Fig.33E

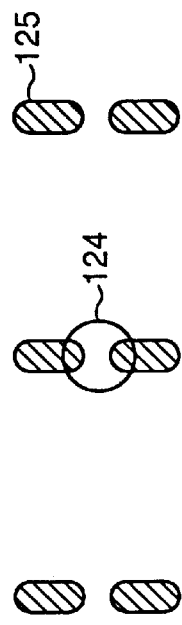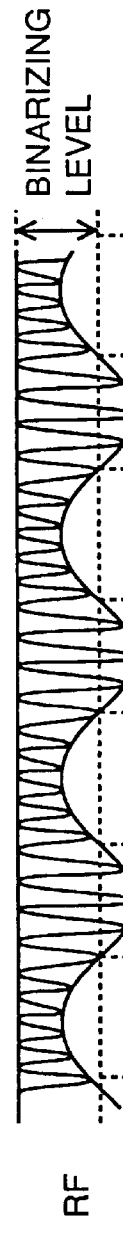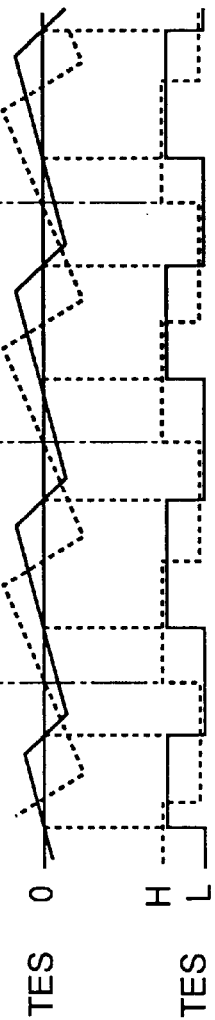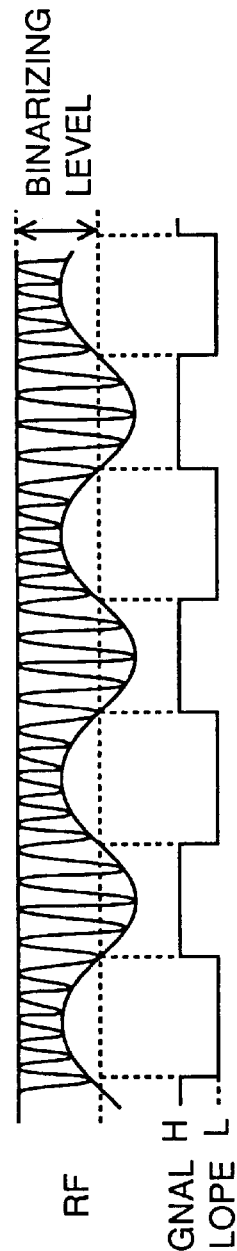
Fig.36A
Fig.36B
Fig.36C
Fig.36D
Fig.36E

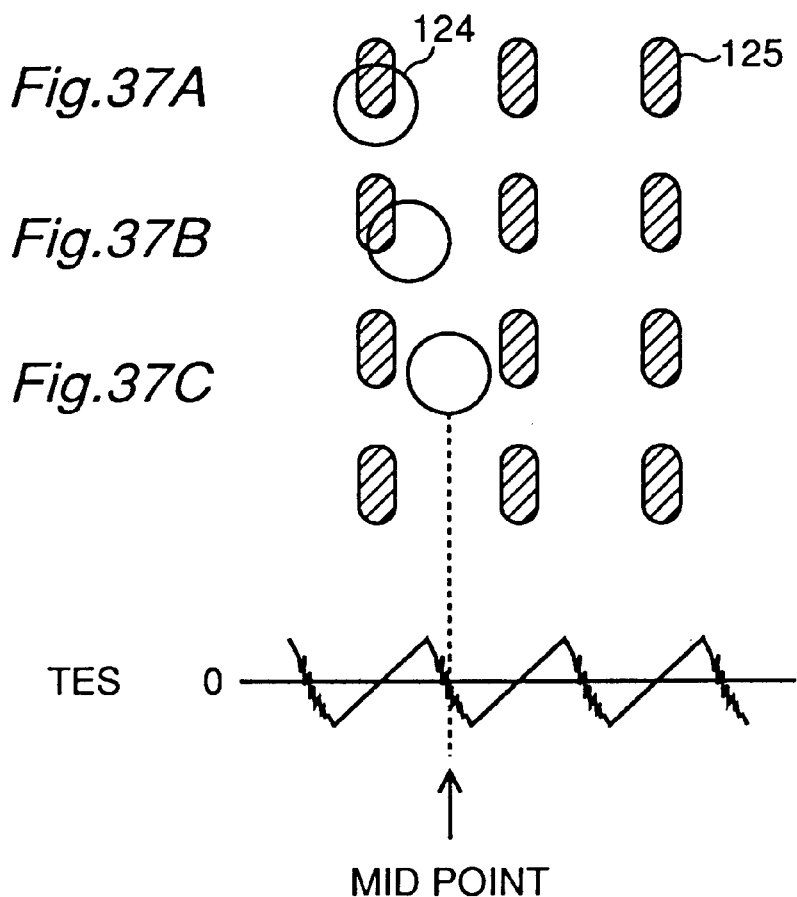

_6,014,354_

TRACKING CONTROL DEVICE FOR OPTICAL PICKUP

BACKGROUND OF THE INVENTION

1. Field of the Invention

The present invention relates to a tracking control device for an optical pickup which optically reproduces information from a record medium, and in particular to a tracking control device for an optical pickup which has an improved structure for producing a tracking error signal used for tracking control.

2. Description of the Background Art

Recently, a method called a phase difference method or a DPD (Differential Phase Detection) method has received particular attention as a method for obtaining a tracking error signal which is used for tracking control of an optical pickup with respect to information pits formed at an information record surface of an optical disk. This phase difference method is specifically described, for example, in Japanese Patent Publication No. 7-105052 (1995). The phase difference method disclosed in this publication utilizes such a fact that, when a light beam radiated to the optical disk pass over information pits, a diffraction pattern, which is a map on photo detectors, changes in accordance with a shift of the light beam from the center of information pits. In the conventional tracking control device disclosed in this publication, to be brief, the photo detector has light receiving regions which are divided in a direction parallel to the tracking direction of the map of the information pits. Levels of output signals corresponding to the quantities of received light at the divided light receiving regions change in different manners corresponding to the directions and quantities of shift of the light beam from the information pit center, respectively. Therefore, the output signal sent from each light receiving region is binarized, and sampling is performed to determine which one of the binary signals changed prior to the other as well as the time difference in level change between these signals. Thereby, the tracking error signal representing the direction and quantity of shift of the light beams is obtained.

Referring to FIGS. 22 to 30, the conventional phase difference method disclosed in the above publication will be described below more specifically. In these figures, reference numbers and characters are different from those in the publication.

FIG. 22 schematically shows a structure of an optical pickup disclosed in Japanese Patent Publication No. 7-105052. Referring to FIG. 22, light beam emitted from a semiconductor laser light source 101 is reflected by a first surface 103 of a light divider 102, and passes through an objective lens 104. The light beam is then gathered to form a minute spot on an information record surface of a record medium, i.e., an optical disk 105. The light beam reflected by optical disk 105 passes through objective lens 104 as well as first surface 103 of light divider 102, and then is diffracted to change its direction by a grating 107, which is formed at a portion of a second surface 106 of light divider 102. The light beams in the changed direction are totally reflected between first and second surfaces 103 and 106 of light divider 102, and reaches a photo detector 108.

FIG. 23 shows a structure of grating 107 and a photo detector in the optical pickup in FIG. 22.

Grating 107 is divided into regions 109, 110 and 111 as shown in FIG. 23. Light beams diffracted at these regions reach photo detector units 112, 113, 114 and 115 of photo detector 108. When a distance between objective lens 104 and optical disk 105 varies, variations occur in quantities of light beam, which is diffracted at region 109 of grating 107 and reaches photo detector units 112 and 113. By calculating a difference between received light quantities at photo detector units 112 and 113, therefore, it is possible to obtain a focus error signal indicating deviation in focusing direction between the light spot and the information record surface of optical disk 105.

In the structure wherein information in optical disk 105 is recorded on information tracks formed of rows of information pits having concavities and convexities, the diffraction pattern of light which occurs when the light spot passes over the information pits can be utilized to obtain a tracking error signal, which indicates a positional deviation on the information record surface between the light spot and one of the information tracks in a direction across the information track.

FIGS. 24A and 24B, FIGS. 25A and 25B, and FIGS. 26A and 26B are diagrams showing first, second and third variation in farfield pattern depending on relative position between the light spot and information pits, which are disclosed in Japanese Patent Publication No. 7-105052, respectively. FIGS. 24A, 25A and 26A show examples of change in relative position between the light spot and information pit, and FIGS. 24B, 25B and 26B show examples of change in farfield pattern, i.e., distribution pattern of the intensity of light reflected from the light spot on optical disk 105, which depends on changes in the relative position shown in FIGS. 24A, 25A and 26A, respectively.

As shown in FIG. 25A, when a light spot 124 formed by the optical pickup moves through centers of information pits, the intensity distribution pattern changes while keeping a laterally symmetrical form as shown in FIG. 25B. If light spot 124 moves through positions shifted from the centers of information pits 125 as shown in FIG. 24A or 26A, the intensity distribution pattern cannot keep the lateral symmetry as shown in FIG. 24B or 26B, and a time difference (phase difference) occurs in change in intensity distribution pattern. The quantities of reflected light at the left and right portions of the intensity distribution pattern are converted into electrical signals by photo detector units 114 and 115 in photo detector 108, respectively, and signal processing is performed to detect the time difference between them, so that the tracking error signal is obtained.

FIG. 27 shows a circuit structure of the tracking control device disclosed in the foregoing Japanese Patent Publication No. 7-105052. FIGS. 28A–28H are timing charts showing an example of an operation of the circuit shown in FIG. 27. FIGS. 29A–29H are timing charts showing another example of the operation of the circuit shown in FIG. 27. FIGS. 30A–30F are timing charts showing still another example of the operation of the circuit shown in FIG. 27.

Signals S1–S7 at various portions in FIG. 27 as well as a tracking error signal TES are shown in FIGS. 28A–28H and 29A–29H, respectively. FIGS. 30A–30F show signals S3–S7 and tracking error signal TES in FIG. 27, respectively.

FIGS. 28A–28H show changes with time, which occur when light spot 124 moves over the information tracks on optical disk 105 from the left side toward the right side in the radial direction of the disk, and in other words, light spot 124 moves over information pits 125 from the state shows in FIGS. 24A and 24B through the state shown in FIGS. 25A and 25B to the state shown in FIGS. 26A and 26B.

In FIG. 27, current signals corresponding to the quantities of light received and detected by photo detector units (which are referred to as "PDU" in the drawings) 114 and 115 are converted into voltage signals S1 and S2 shown in FIGS. 28A and 28B by current-voltage converters (i/v) 116 and 117, respectively. Voltage signals S1 and S2 are converted into binary signals S3 and S4 shown in FIGS. 28C and 28D by binarizing circuits 118 and 119, respectively. In this case, the foregoing tracking error signal can be detected by detecting the phase difference which is the time difference in rising or falling between binary signals S3 and S4. In the above publication, the time differences in rising between binary signals S3 and S4 is detected by D-flip-flops 120 and 121. D-flip-flops 120 and 121 issue from their output terminals Q output pulses S5 and S6, of which pulse widths from rising to falling correspond to the time difference. The pulses representing such a time difference are shown in FIGS. 28E and 28F. The time difference pulses S5 and S6 are converted by a difference detector 122 into a pulse width modulation signal S7 shown in FIG. 28G. Signal S7 is converted by a low-pass filter (LPF) 123 into an analog tracking error signal TES shown in FIGS. 28H.

The right and left ends of the abscissas in FIGS. 28A–28H represent shifting of light spot 124 from the center of information pit 125. When light spot 124 is shifted from the center of information pit 125, signals S1 and S2 sent from photo detector units 114 and 115 cause not only change in time difference but also change in frequency representing the frequency of occurrence of change. In order to prevent a failure in detection of the time difference, therefore, the structure in the above publication employs D-flip-flops 120 and 121 for detecting the time difference. According to the prior art in this publication, each of D-flip-flops 120 and 121 has a terminal T serving as a clock input terminal and a reset input terminal arranged at the bottom thereof and bearing no reference character. When the reset input terminal is at a logical level L, an output terminal Q is unconditionally at level L. When the reset input terminal is at level H, the logical level equal to that applied to input terminal D is applied to terminal Q at the time of rising of the signal on clock input terminal T.

According to the art in the above publication, however, a failure in detecting the phase difference which is the time difference can be prevented only in an extremely limited state as will be described below. In the structure shown in FIG. 27, the time difference indicating the tracking error is detected based on the falling of binary signals S3 and S4. When a level change occurs in one of the binary signals shown in FIGS. 28C and 28D while the other signal is at level L, this structure in FIG. 27 does not erroneously detect the time difference in response to this change, and D-flip-flops 120 and 121 do not issue pulses S5 and S6, respectively. However, when the level change occurs in one of binary signals S3 and S4 while the other is at level H, this situation is erroneously detected as a time difference, which significantly affects tracking error signal TES. It is assumed that minute abnormal waveforms encircled by broken lines in FIGS. 29A and 29B occur at signals S1 and S2 due to a physical defect on the optical disk surface, externally applied electrical noises or an influence by information pits on a neighboring track. In this case, glitches indicated by arrows in FIGS. 29C and 29D occur at signals S3 and S4, respectively. The glitches enlarge the outputs of D-flip-flops 120 and 121 which are, in other words, pulse widths of pulse signals S5 and S6 in FIGS. 29E and 29F indicating the time difference as well as the pulse width of signal S7 in FIG. 29G, and more specifically enlarge these widths from the positions represented by broken lines and indicating the time differences corresponding to the original tracking error to the positions represented by solid lines and determined due to the glitches in the direction represented by arrows. These pulse widths can be apparently larger than the glitches themselves. As a result, tracking error signal TES in FIG. 29H issued from LPF 123 has a larger amplitude which is represented by a solid line and is enlarged in the directions indicated by arrows from the original amplitude represented by a broken line, and is significantly disturbed compared with signal TES in FIG. 28H.

Particularly, this influence increases when an abnormality occurs at the foregoing signal waveform while light spot 124 is precisely tracking the row of information pits 125. As shown in areas around centers of the abscissas in FIGS. 29A–29H, binary signals S3 and S4 change with the completely same phases when light spot 124 accurately tracking the row of information pits 125. Therefore, there is not time difference (phase difference) in rising and falling between these signals, and pulses S5 and S6 exhibiting a time difference are not generated so that tracking error signal TES maintains 0. However, if abnormalities occur at signals S3 and S4, which are original signals used for detecting the time difference, due to the foregoing reason, pulse signals S5 and S6 exhibiting the time difference much wider than the glitch itself are generated at and after the time of occurrence of the glitch as shown in FIGS. 30A–30F, and tracking error signal TES is disturbed to a large extent as shown in FIG. 30F. As described above, tracking error signal TES is originally 0 in this case, and light spot 124 accurately tracks the row of information pits 125. Thus, a so-called on-track state is achieved in this case. In spite of this, only a minute abnormality in the signal waveform causes a large error in tracking error signal TES. Therefore, the position of light spot 124 is significantly shifted from the position in the on-track state, so that accurate reproduction of information cannot be performed, and finally light spot 124 may completely be shifted away from the track.

In the conventional tracking control device, as described above, the glitch occurs due to a defect on the optical disk, externally applied noises, an influence by information pits 125 on a neighboring track. When the time difference is erroneously detected due to the glitch, this affects tracking error signal TES to an extent larger than that by the width of glitch.

FIGS. 31A and 31B show a relation between the light spot and the track, together with a waveform of tracking error signal TES in the phase difference (DPD) method in the structure shown in FIGS. 27 and the embodiments of the invention. Tracking error signal TES, which is obtained by using the signal processing circuit and the optical pickup having the structure disclosed in the foregoing publication, has a substantially linear form as shown in FIG. 28H, in which the level is 0 when light spot 124 is located immediately on a center of a track, and has the polarity corresponding to the direction of lateral shift (off-track) of the light spot 124 from the same track. In connection with a plurality of tracks, as shown in FIGS. 31A and 31B, the linear signal waveform appears for each track, and the level of 0 is likewise attained when light spot 124 is located between the tracks. Therefore, the signal have a sawtooth waveform having cycles corresponding to the tracks as a whole, as shown in FIG. 31B.

FIGS. 32A and 32B show a relation between the tracking error signal and the direction, in which the light spot is to be driven for the tracking servo-control, in the structure shown in FIG. 27.

For performing the tracking servo-control with the tracking error signal, which exhibits the sawtooth waveform corresponding to the tracks and has the polarities shown in FIG. 31B, a tracking servo-control system may have a structure provided with an unillustrated drive portion (generally called an tracking actuator) which drives objective lens 104 in such a manner than the position of light spot 124 moves selectively in the directions indicated by arrows A and B in FIG. 32A in accordance with the positive and negative polarities of tracking error signal TES, respectively.

For operating the optical pickup, it is necessary to employ not only the tracking servo-control for accurately moving light spot 124 to follow the tracks but also the track traversing operation called a "track jump" or a "track search" for moving light spot 124 to traverse the track in order to search and reproduce arbitrary information on disk 105 and, in other words, for moving the position of light spot 124 to an intended track in the radial direction of disk 105.

FIGS. 33A–33E shows a principle of detecting the number of traversed tracks and the traversing direction based on the tracking error signal and the reproduced information signal in the prior art. In order to improve the accuracy of the track traversing operation, tracking error signal TES can be referred to. More specifically, as shown in FIGS. 33A and 33B, attention is given to the fact that tracking error signal TES on the track crosses (zero-crosses) 0 level. Based on this fact, processing is performed to count the number of rising edges or falling edges of a signal in FIG. 33C which is prepared by binarizing tracking error signal TES, e.g., by a comparator. The count thus obtained represents the number of tracks which light spot 124 traversed.

Since tracking error signal TES performs the zero-crossing also at a position between the neighboring tracks, it is desired to refer additionally, at the same time, to a reproduced information signal RF for more accurate counting. For this additional reference, such a fact is utilized that signal RF in FIG. 33D located on the track has a large amplitude, and processing is performed to produce a signal shown in FIG. 33E, which attains logical level H when the envelope amplitude of signal RF exceeds a predetermined value (binarizing level). The edges of the signal in FIG. 33C produced by binarizing tracking error signal TES are counted only when the signal in FIG. 33E is at level H. In this manner, the above additional reference can be performed.

The traversing direction of light spot 124 with respect to the track (row of information pits 125) can be determined using the foregoing signals. For example, this direction can be determined by detecting which of the levels H and L does the signal in FIG. 33C attain at the rising edge of the signal in FIG. 33E. If the signal in FIG. 33C is observed and determined to be at level L at the rising edge of the signal in FIG. 33E, it can be found that light spot 124 traverses the track rightward in FIG. 33A. The change (edge) in the signal in FIG. 33C may be determined when the signal in FIG. 33E is at level H, so that the traversing direction can be determined based on the detected edge, i.e., the rising or falling edge. In this method, if the rising edge of the signal in FIG. 33C is detected when the signal in FIG. 33E is at level H, it is determined that light spot 124 traverses rightward in FIG. 33A.

According to the phase difference method (DPD method), tracking error signal TES has a sawtooth waveform as shown in FIG. 31B owing to the relative position between light spot 124 and the tracks in the direction across the tracks on the information record surface. By using this, the tracking servo-control for controlling light spot 124 to follow accurately the tracks is allowed. Also, when light spot 124 traverses the tracks for searching an intended track, the number of the traversed tracks and the traversing direction can be detected for increasing the accuracy of the track traversing operation of light spot 124. These have been described above.

For producing tracking error signal TES by the phase difference method (DPD method), as described before, it is necessary to extract low-frequency components of pulses (which will be referred to as "phase difference pulses" hereinafter) corresponding to the phase difference, which appears between two signals and corresponds to an amount of relative shift between light spot 124 and the track center. Properties (time constant) of the LPF, integrator or the like used for the extraction are fixed in the prior art.

When the phase difference method (DPD method) is to be used for obtaining tracking error signal TES, therefore, it is difficult in the prior art to satisfy both the operation for tracking servo-control and the track traversing operation. In other words, individual losses are produced depending on the manners of setting the time constant of the LPF or integrator, so that it is difficult to satisfy both the foregoing operations at the same time. Individual losses caused by setting the time constant to a certain value will be discussed below. This will clarify disadvantages in the prior art. As an example, it is now assumed that the time constant is set to a relatively small value, and individual losses will be successively discussed below.

FIGS. 34A and 34B show frequency characteristics of a gain and a phase of a primary LPF in the prior art. FIGS. 36A–36C show erroneous detection of the number of tracks traversed by the light spot and the traversing direction, and particularly the erroneous detection caused when the track traversing speed of the light spot is increased.

The first advantage achieved by setting the time constant to a small value is increase in stability owing to increase in phase margin of the tracking servo-control system.

For example, if the primary LPF is used for averaging processing of the phase difference pulse, the characteristics shown in FIGS. 34A and 34B are exhibited. At a pole frequency $f_{LPF}$ (normally set to tens of kilohertz) of the primary LPF, the gain is −3dB based on that with DC as shown in FIG. 34A, and the phase is −45 degrees as shown in FIG. 34B. At frequencies lower than the pole frequency $f_{LPF}$, the gain and phase approach 0 dB and 0 degree, respectively. At frequencies higher than the frequency $f_{LPF}$, the gain and phase asymptotically approach −∞ dB (gain is 0 in absolute value) and −90 degrees, respectively.

As is well known, such a design is employed for stabilizing the servo-control system that a phase margin Om (i.e., a margin until the phase reaches −180 degrees at a cut-off frequency fc, in other words, at a frequency at which the gain is 0 dB) can be from about 30 to about 50 degrees owing to phase lead compensation (or differential calculus compensation). If the foregoing phase lag of the LPF is large, this phase margin significantly decreases so that the tracking servo-control system is liable to become unstable. However, if the pole frequency $f_{LPF}$ is set to a high value (i.e., the time constant is set to a small value), the phase lag decreases, and reduction in phase margin is also suppressed, so that the stable operation of the tracking servo-control system can be easily performed.

The second advantage achieved by employing the small time constant of the LPF or the integrator is as follows. In the track traversing operation of light spot 124, and particularly in the track search for which light spot 124 traverses a large number of tracks at a high speed, an error in determination of the traversing direction is unlikely to occur.

In the track traversing operation, it is generally necessary to detect the track traversing direction for controlling acceleration and deceleration of the relative speed of light spot 124 with respect to the track. The principle thereof is shown in FIGS. 33A–33E. Description will now be given on an influence in the case that the time constant is large and the phase lag (time lag) occurs in tracking error signal TES with reference to FIGS. 36A—36E and FIGS. 33A–33E.

When the track traversing speed of light spot 124 is low and therefore the repetition frequency of the sawtooth waveform of tracking error signal TES is low, or the foregoing time constant is small, the phase lag in tracking error signal TES during the track traversing does not particularly cause a problem. The number of traversed tracks and the traversing direction can be detected as already described with reference to FIGS. 33A–33E.

When the track traversing speed of light spot 124 is high and the repetition frequency of the sawtooth waveform of tracking error signal TES is high, the phase lag and reduction in amplitude due to the integrator or LPF gradually become remarkable in tracking error signal TES if the time constant is large. In this case, signal RF, tracking error signal TES and binary signals obtained therefrom exhibit relation shown in FIGS. 36A—36E which are different from those in FIGS. 33A–33E. In FIG. 36B, tracking error signal TES having a waveform represented by a solid line has a smaller amplitude and a delayed phase compared with the original waveform represented by a broken line. Therefore, the signal in FIG. 36C produced by binarizing it has edges shifted from those of the original waveform. If tracking error signal TES in FIG. 36B has a small amplitude, binarizing thereof may not be accurately performed, resulting in such phenomena that the position of the edge is shifted to a large extent or it is impossible to obtain the signal itself in FIG. 36C by binarizing signal TES. Therefore, even if the binary signal in FIG. 36C produced by binarizing tracking error signal TES in FIG. 36B is sampled at rising or falling of the signal in FIG. 36E produced by binarizing the envelope of signal RF in FIG. 36D with a predetermined level, the level of the sampled signal in FIG. 36C is instable, resulting in erroneous determination of the traversing direction of light spot 124.

Determination of the traversing direction of the light spot is required, for example, immediately after the start of the track search operation or immediately before the end of the same, and more specifically in such a case that the speed at which light spot 124 is driven with respect to the tracks may not be large compared with the speed of traversing in the opposite direction caused by decentering or eccentricity of the disk, and these relative speeds of the light spot 124 with respect to the tracks may be inverted (and therefore the relative moving direction may be inverted). While the moving or driving speed of light spot 124 with respect to the track is sufficiently high, the above inversion of the relative speeds cannot occur, so that the determination of the direction is not necessary, and the track traversing can be appropriately performed without referring to tracking error signal TES. If a large eccentricity is present at the disk, a high disk rotation speed is employed for fast data transfer, or a small track pitch is employed for improving the record density, the aforementioned relative speed due to the eccentricity at the disk is large, and it is necessary to perform the direction determination until the speed of moving light spot 124 with respect to the tracks exceeds this relative speed. Therefore, if a large time constant is employed, the direction may be erroneously determined due to the phase lag and the reduction in amplitude of tracking error signal TES.

However, if a small time constant of the LPF or integrator is employed, influences causing the phase lag and amplitude reduction of tracking error signal TES can be small even in the above situation, so that the error in direction determination can be reduced. This is the second advantage which can be achieved by employing a small time constant.

Meanwhile, a first disadvantage caused by employing a small time constant of the LPF or integrator is that defects on the disk or the like tends to disturb tracking error signal TES so that the accuracy in tracking servo-control is liable to be impaired.

When defects are present at the disk, diffracted or reflected light beams at light spot 124 radiated onto the track are disturbed so that abnormal or irregular pulses are mixed into the phase difference pulses. The width of such abnormal or irregular phase difference pulses and the frequency of occurrence thereof depend on the degree, extent and others of the defects. If the time constant of the LPF or integrator is small (i.e., if diffraction frequency $f_{LPF}$ is high in LPF), the abnormal or irregular phase pulses are not sufficiently averaged, and a irregularity occurs on tracking error signal TES so that the accuracy of the tracking servo-control system deteriorates. Particularly, if a large defect or the like is present at the disk, light spot 124 is fully shifted from the track, resulting in a significant problem.

A second disadvantage caused by employing the small time constant of the LPF or integrator is as follows. It is difficult to detect a midpoint between the tracks which is desired to be detected in the track traversing operation of light spot 124, and particularly for the track jump operation performed by traversing several tracks.

In the tracking servo-operation, and, in other words, when light spot 124 is following the track, the defects or the like at the disk disturb tracking error signal TES as already described. However, as light spot 124 is shifted from the center line of the track to a higher extent, a disturbance tends to occur at the waveform of tracking error signal TES produced by the phase difference (DPD) method to a higher extent even if no defect is present on the disk.

FIGS. 37A–37D show a relation between the off-track of the light spot and the disturbance at the waveform of the tracking error signal in the circuit structure shown in FIG. 27. FIGS. 37A–37C show a transition from the on-track state to the off-track state of the light spot, and FIG. 37D shows tracking error signal TES issued from the circuit in FIG. 27 in accordance with the transition or change of the states in FIGS. 37A–37C. According to the phase difference (DPD) method, as already described, tracking error signal TES is produced based on the phase difference pulses corresponding to the timings of changes of the light quantities at the right and left regions of light spot 124 divided in the tracking direction while light spot 124 is passing over information pits 125. As shown in FIGS. 37A–37C, when light spot 124 is significantly shifted from the center line of the track (row of information pits 125) and approaches the midpoint between the tracks, a region of light spot 124 covering information pit 125 decreases in accordance with the above approach, and it becomes difficult to detect from the reflected light beams that light spot 124 passed over information pit 125. Therefore, abnormal or irregular pulses appear in the phase difference pulses corresponding to the amount of shift between light spot 124 and the track, i.e., the off-track amount, so that the waveform of tracking error signal TES in FIG. 37D is gradually disturbed. In particular, when light spot 124 is located at the midpoint between the neighboring tracks and covers slightly both the left and right adjacent tracks, abnormal and irregular pulses are most likely to occur at the phase difference pulse due to a minute change in the light beams reflected or diffracted by information pits 125 at the left and right tracks neighboring thereto, so that tracking error signal TES in FIG. 37D is disturbed to the highest extent.

Detection of the position between the tracks is usually unnecessary when light spot 124 traverses tens or hundreds of tracks or more a time. However, in the jump operation of jumping several tracks or less, it is necessary to detect the position between the tracks for determining the timing of acceleration or deceleration of light spot 124 and thereby increasing a success rate. In an extreme case, both the acceleration and deceleration of light spot 124 are required only during movement over one track for performing one-track jump operation, which is often employed in still jump. For this purpose, it is necessary, for stabilizing the jump operation, to detect the midpoint between the tracks as the switching point between the acceleration and deceleration of light spot 124 even if a certain error is present.

However, if tracking error signal TES is disturbed between the tracks as shown in FIG. 37D, the midpoint between the tracks cannot be detected accurately, so that light spot 124 cannot be accelerated and decelerated stably at accurate timings and therefore a failure is liable to occur in the track jump operation (traversing).

If the time constant of the LPF or integrator is large, the aforementioned abnormal and irregular pulses in the phase difference pulses are strongly averaged, so that a disturbance at tracking error signal TES at and around the midpoint between the tracks is reduced, and the midpoint between the tracks can be easily detected from the zero-cross point. However, if the time constant is small, tracking error signal TES at and around the midpoint between the tracks is disturbed to a large extent as shown in FIG. 37D, and it is difficult to detect the midpoint between the tracks from the zero-cross point.

As described above, if the time constant of the LPF or integrator is small, the foregoing two advantages and two disadvantages arise in the circuit shown in FIG. 27. On the other hand, if the time constant of the LPF or integrator is large, advantages and disadvantages opposite to the above naturally arise. Determination of the value of the time constant in each tracking control device is a matter of design. In the conventional tracking control device for producing tracking error signal TES by the phase difference (DPD) method, the characteristics of the low-pass portion, i.e., characteristics of the LPF or integrator are set commonly to quite different two operations, i.e., the tracking servo-control and the tracking traversing operation. Therefore, it is impossible to overcome the disadvantages while maintaining the foregoing advantages. Thus, the tracking control device in the prior art can satisfy, at the same time, only two of the four items, i.e., (1) stability of the tracking servo-control system, (2) accuracy of the direction determination during track search, (3) accuracy of the tracking servo-control with respect to defects on the disk or the like, and (4) detection of the midpoint between the tracks during track jump. Therefore, the prior art suffers from such a problem that a trade-off relationship is unavoidably present between the accuracy of the track traversing and stability/accuracy of the tracking servo-control.

SUMMARY OF THE INVENTION

An object of the invention is to provide a tracking control device for an optical pickup, which can suppress a disturbance at a tracking error signal produced by a phase difference method even if a glitch is mixed into a received light signal obtained by receiving light beam reflected from a disk to which a light spot is radiated.

Another object of the invention is to provide a tracking control device for an optical pickup, which achieves an appropriate accuracy of a track traversing operation as well as appropriate stability and accuracy of tracking servo-control in an operation of producing a tracking error signal by a phase difference method.

In order to achieve the above object, a tracking control device for an optical pickup according to the invention is a device, wherein, for reproducing information from a disk carrying the information recorded on a plurality of tracks, a light spot is radiated to the predetermined track, light beams reflected from the track is received on at least two regions divided in a tracking direction, and two electrical signals corresponding to quantities of received light beams on the divided regions are issued, respectively. More specifically, the device according to the invention includes a pulse producing portion for binarizing the two electrical signals issued from the optical pickup to form binary signals, and issuing two-phase pulses each having a time width starting from the time point of change in one of the two binary signals from a first level to a second level and terminating at earlier one between the time point of return of the one binary signal to the first level and the time point of change in the other binary signal from the first level to the second level, the two-phase pulses being issued depending on the binary signal between the two binary signals completing earlier change from the first level to the second level; an error signal producing portion for producing a tracking error signal indicating a relative position between the predetermined track and the light spot based on the two-phase pulses issued from the pulse producing portion; and a drive portion for driving the optical pickup to move the light spot in the tracking direction based on the produced tracking error signal and thereby performing a tracking servo operation or a track traversing operation.

Accordingly, even if a glitch is mixed into the binary signal produced from the electrical signal, which is obtained from the optical pickup, due to defects on the disk, external noises and an influence by information pits on the track neighboring to the predetermined track, the influence by the glitch on the tracking error signal can be restricted only to an extent corresponding to the width of the glitch. Therefore, a disturbance at the tracking error signal is suppressed, and impediments to the accuracy of the tracking servo-control and reproduction of information can be prevented.

The pulse producing portion may include two AND gates for issuing the two-phase pulses. In this case, a muting function for the tracking error signal can be achieved only by applying to inputs of the AND gates a signal for controlling output of pulses. Therefore, the muting function for the tracking error signal can be achieved without adding a new circuit component, and it is possible to suppress unnecessary operations of downstream circuits.

The pulse producing portion may include D-type flip-flop circuits and logical gates, and therefore has a simple structure.

In order to achieve the above object, a tracking control device for an optical pickup according to another aspect of the invention has the following structure. The tracking control device includes a pulse producing portion for binarizing two electric signals issued from the optical pickup to form binary signals, respectively, and issuing two-phase pulses based on relative time differences of the respective binary signals, an error signal producing portion using a low-pass portion having a plurality of switchable different time constants for producing a tracking error signal indicative of a relative position between the predetermined track and the light spot based on the two-phase pulses issued from the pulse producing portion, a drive portion for driving the optical pickup based on the produced tracking error signal to move the light spot in the tracking direction and to perform a tracking servo operation or a track traversing operation by the light spot, and a time constant setting portion for selecting and setting in the low-pass portion the time constant among the plurality of time constants corresponding to the operation of the optical pickup driven by the drive portion.

Since the tracking control device according to the above aspect has the foregoing structure, the time constant of the low-pass portion, which is required for producing the tracking error signal by the phase difference method, can be selectively set in accordance with each of the tracking servo operation and the track traversing operation. Therefore, the characteristics of the low-pass portion can be variably set to be optimum for the quite different operations, i.e., the tracking servo operation and the track traversing operation. Therefore, it is possible to achieve appropriately stability in the tracking servo-control system, accuracy of the direction determination for track searching, accuracy of the tracking servo-control with respect to defects on the disk or the like, and accuracy of the track jump.

The above switching of the characteristics of the low-pass portion is performed depending on the frequency of the signal reproduced from the disk.

Therefore, in such a case that a reproduced signal has a high frequency because of a high recording density of information on the disk or a high-speed rotation of the disk for reproduction, the time constant setting portion sets the small time constant in the low-pass portion so that the control can be performed not to increase the phase lag or time lag of the tracking error signal. Therefore, the track midpoint can be detected more accurately during the track jump, and the accuracy of the track jump is further increased. In the tracking servo operation, reduction in phase margin can be prevented while suppressing deterioration of the control accuracy due to defects on the disk or the like, so that the tracking servo-control can be performed more stably.

The low-pass portion may include a plurality of resistors, and the time constant setting portion may select and set the time constant by changing the composite resistance value of the plurality of resistors.

Therefore, switching of the time constant can be performed without causing a rapid change (change in a step form) in the tracking error signal, so that an adverse influence is not applied on the accuracy of the tracking servo operation, the number of traversed tracks during track traversing, determination of the traversing direction and detection of the track midpoint. Since switching of the time constant is performed by changing the composite resistance value, breakage of circuit components forming the low-pass portion can be prevented. Since the switching of the time constant is not performed by switching capacitors, the low-pass portion or a circuit containing the same can be completed as an IC requiring reduced numbers of leader pins and external attachments, so that the cost and mounting area can be small.

In order to achieve the above object, a tracking control device for an optical pickup according to still another aspect of the invention includes a pulse producing portion for binarizing two electrical signals issued from an optical pickup to form binary signals, and issuing two-phase pulses each having a time width starting from the time point of change in one of the two binary signals from a first level to a second level and terminating at earlier one between the time point of return of the one binary signal to the first level and the time point of change in the other binary signal from the first level to the second level, the two-phase pulses being issued depending on the binary signal between the two binary signals completing earlier change from the first level to the second level; an error signal producing portion using a low-pass portion having a plurality of switchable different time constants for producing a tracking error signal indicative of a relative position between the predetermined track and the light spot based on the two-phase pulses issued from the pulse producing portion, a drive portion for driving the optical pickup based on the produced tracking error signal to move the light spot in the tracking direction and to perform a tracking servo operation or a track traversing operation, and a time constant setting portion for selecting and setting in the low-pass portion the time constant among the plurality of time constants corresponding to the operation of the optical pickup driven by the drive portion.

The tracking control device of the above aspect having the foregoing structure can achieve an effect similar to those of the tracking control devices already described.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A–7K are timing charts showing operation timings of the circuit in FIG. 6;

FIGS. 8A–8I are timing charts showing other operation timings of the circuit in FIG. 6;

FIGS. 12A and 12B show a relation between a time constant of a LPF for averaging phase difference pulses in the circuit shown in FIG. 11 and a waveform of a tracking error signal produced when a light spot traverses tracks;

FIGS. 13A–13G shows a relation between a time constant of the LPF in the circuit shown in FIG. 11 and a disturbance at the tracking error signal caused when an abnormal phase difference pulse occurs due to a defect in a disk during a tracking servo operation;

FIGS. 26A and 26B schematically show third example of a variation in farfield pattern caused by a relative position between a light spot and information pits in the prior art and the embodiments of the invention;

FIG. 27 shows a circuit structure of the conventional tracking control device applied to the optical pickup in FIG. 22;

FIGS. 28A–28H are timing charts for showing an operation of the device in FIG. 27;

FIGS. 29A–29H are timing charts for showing another operation of the device in FIG. 27;

FIGS. 30A–30F are timing charts for showing still another operation of the device in FIG. 27;

FIGS. 33A–33E show a conventional principle for detecting the number of traversed tracks and the traversing direction using the tracking error signal and a reproduced information signal;

FIGS. 36A—36E shows the manner of detecting, by the structure in FIG. 27, the number of tracks traversed by the light spot and the traversing direction with the increased track traversing speed of the light spot; and FIGS. 37A–37D show a relation between an off-track of the light spot and a disturbance at the waveform of the tracking error signal in the circuit structure in FIG. 27;

DESCRIPTION OF THE PREFERRED EMBODIMENTS

First and second embodiments of the invention will be described below with reference to the drawings.

First Embodiment

As a first embodiment, description will now be given on a tracking control device for an optical pickup, and more specifically the track control device for preventing a large error which may occur in a tracking error signal due to a defect on an optical disk, externally applied noises and/or an influence of information pits on an adjacent track.

Figure 1:
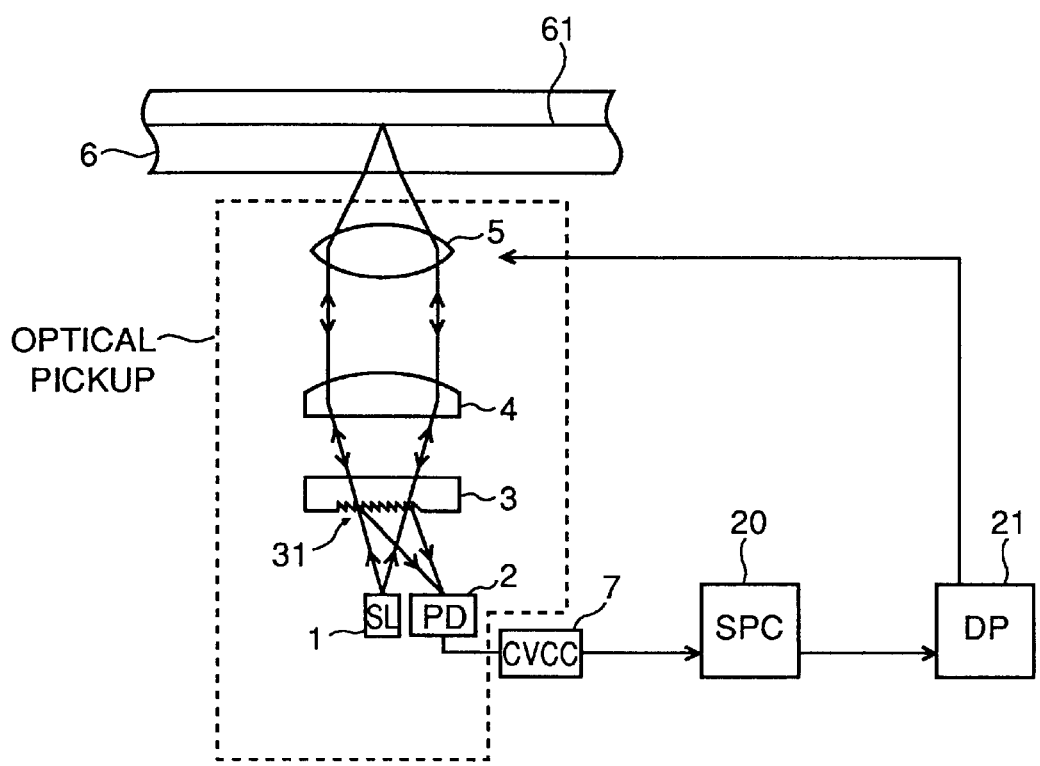
FIG. 1 schematically shows structures of an optical pickup and a tracking control device for the same according to a first embodiment of the invention.

FIG. 1 schematically shows structures of the optical pickup and the tracking control device for the same according to the first embodiment of the invention. Referring to FIG. 1, the optical pickup includes a light source, i.e., semiconductor laser (which is referred to as "SL" in the drawings) 1, a photo detector (which is referred to as "PD" in the drawings) 2 having a plurality of divided photo detector elements, a hologram unit 3 having a diffraction grating, i.e., a hologram 31 inscribed on its glass surface, a collimator lens 4 and an objective lens 5. The tracking control device for this optical pickup includes a current-voltage converter circuit (which is referred to as "CVCC" in the drawings) 7 for converting current signals sent from photo detector 2 into voltage signals, a signal processing circuit (which is referred to as "SPC" in the drawings) 20, and a drive portion (which is referred to as "DP" in the drawings) 21 for driving objective lens 5. The tracking control device controls the tracking of a light spot of the optical pickup on information record surface 61 of a record medium, i.e., an optical disk 6.

Light beam radiated from semiconductor laser 1 passes through hologram unit 3, is changed into parallel light beam by collimator lens 4, and is gathered by objective lens 5 to form a minute light spot on information record surface 61 of optical disk 6. The light beam reflected by information record surface 61 of optical disk 6 is diffracted by hologram 31 when it passes through hologram unit 3 after passing through lenses 5 and 4, and then enter photo detector 2. The light beams diffracted by hologram 31 and received by each element of photo detector 2 are converted into current signals, which correspond to the intensity of light beams and are applied to current-voltage converter circuit 7. The current signals corresponding to each element of photo detector are converted into voltage signals by circuit 7, and are issued therefrom.

Figure 2:
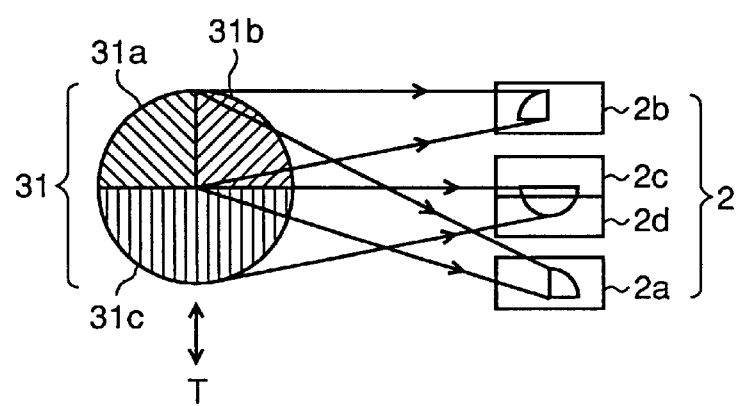
FIG. 2 shows a hologram unit and photo detector of the optical pickup in FIG. 1.

FIG. 2 shows the hologram unit and the photo detector elements of the optical pickup in FIG. 1. FIG. 2 shows a positional relation between hologram 31 inscribed at hologram unit 3 and the light beams which are diffracted by hologram 31 and enter photo detector 2. Hologram 31 has divided hologram regions 31a, 31b and 31c having different diffraction directions. The light beams which are diffracted in different directions by these hologram regions enter photo detector elements 2a, 2b, 2c and 2d of photo detector 2, respectively. In FIG. 2, an arrow T indicates a track advancing or forward direction, i.e., a direction of a length of an information track (row of information pits) related to entry of the light beam reflected by optical disk into hologram 31. A dividing or boundary line between hologram regions 31a and 31b in hologram 31 extends in the direction indicated by arrow T.

When the distance between objective lens 5 and optical disk 6 changes, changes also occur in diameter and position of the light beam reflected by optical disk 6 and entering hologram unit 3. In accordance with the above change in distance, a change occurs also in position of the light beam (shown as a substantially semicircular pattern in the figure), which is diffracted by hologram region 31c in hologram 31 and enter the photo detector elements 2c and 2d of photo detector 2. Therefore, a position error signal related to objective lens 5 and optical disk 6, i.e., a focus error signal is obtained based on the different between outputs of photo detector elements 2c and 2d of photo detector 2. This method of obtaining the focus error signal is well known as the Foucault method, and therefore will not be described below further in detail.

Based on the above focus error signal, objective lens 5 is driven by a drive portion, which is called a lens actuator and is not shown in the figure, or the drive portion 21 to keep always a constant distance to optical disk 6. Thereby, the structure can perform a so-called focus control, i.e., a control for always keeping such a state that the converged light beam spot is formed on information record surface 61.

The light beams diffracted by hologram regions 31a and 31b of hologram 31 enter photo detector elements 2a and 2b of photo detector 2, respectively, and are output as voltage signals from current-voltage converter circuit 7. These voltage signals are processed and output as a tracking error signal by the circuit in FIG. 3.

Figure 3:
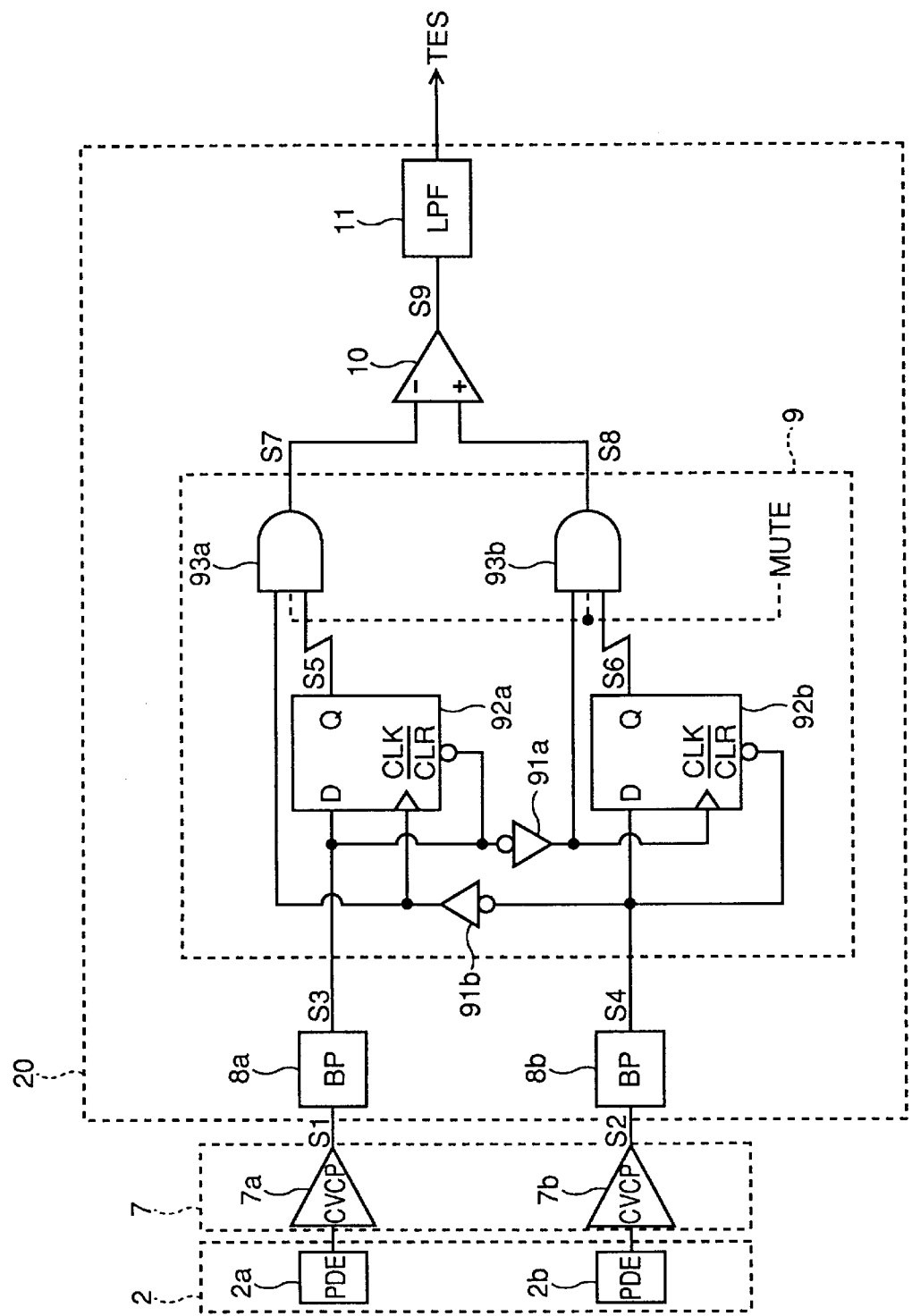
FIG. 3 shows a circuit structure of a signal processing circuit in FIG. 1.

FIG. 3 shows a circuit structure of signal processing circuit 20 in FIG. 1. In FIG. 3, signal processing circuit 20 in FIG. 1 is shown together with photo detector 2 and current-voltage converter circuit 7. In the figure, current-voltage converter circuit 7 includes current-voltage converting portions (which are referred to as "CVCP" in the drawings) 7a and 7b for converting the current signals sent from photo detector elements (which are referred to as "PDE" in the drawings) 2a and 2b of photo detector 2 into voltage signals and outputting the same, respectively. Current-voltage converting portions 7a and 7b may have appropriate amplification degrees. Signal processing circuit 20 includes binarizing portions (which are referred to as "BP" in the drawings) 8a and 8b for converting the voltage signals sent from current-voltage converting portions 7a and 7b into binary signals, i.e., digital signals, a pulse issuing portion 9 for issuing two-phase pulses in accordance with time differences (phase differences) between these digital signals, a difference detector 10 which produces a pulse signal having both the positive and negative polarities by differentiating the two-phase pulses sent from pulse issuing portion 9, and a LPF 11 which averages the output pulse signal sent from difference detector 10 and thereby converts the same into an analog signal to be issued as a tracking error signal TES.

Pulse issuing portion 9 includes NOT gates (logic inversion circuits) 91a and 91b, D-type flip-flops (which will be referred to as "D-FFs" hereinafter) 92a and 92b, and AND gates 93a and 93b. Each of D-FFs 92a and 92b differs from that in FIG. 27 in that it outputs to a terminal Q an input signal level, which is attained on an input terminal D at the time of rising of the level on a clock input (CLK) terminal from level L to level H. Therefore, pulse issuing portion 9 has such a structure that issues two-phase pulses by detecting time differences (phase differences) in falling from level H to level L between the digital signals sent from binarizing portions 8a and 8b. When level on the clear (CLR) terminal falls to level L, level on the terminal Q unconditionally falls to level L.

Figure 4:
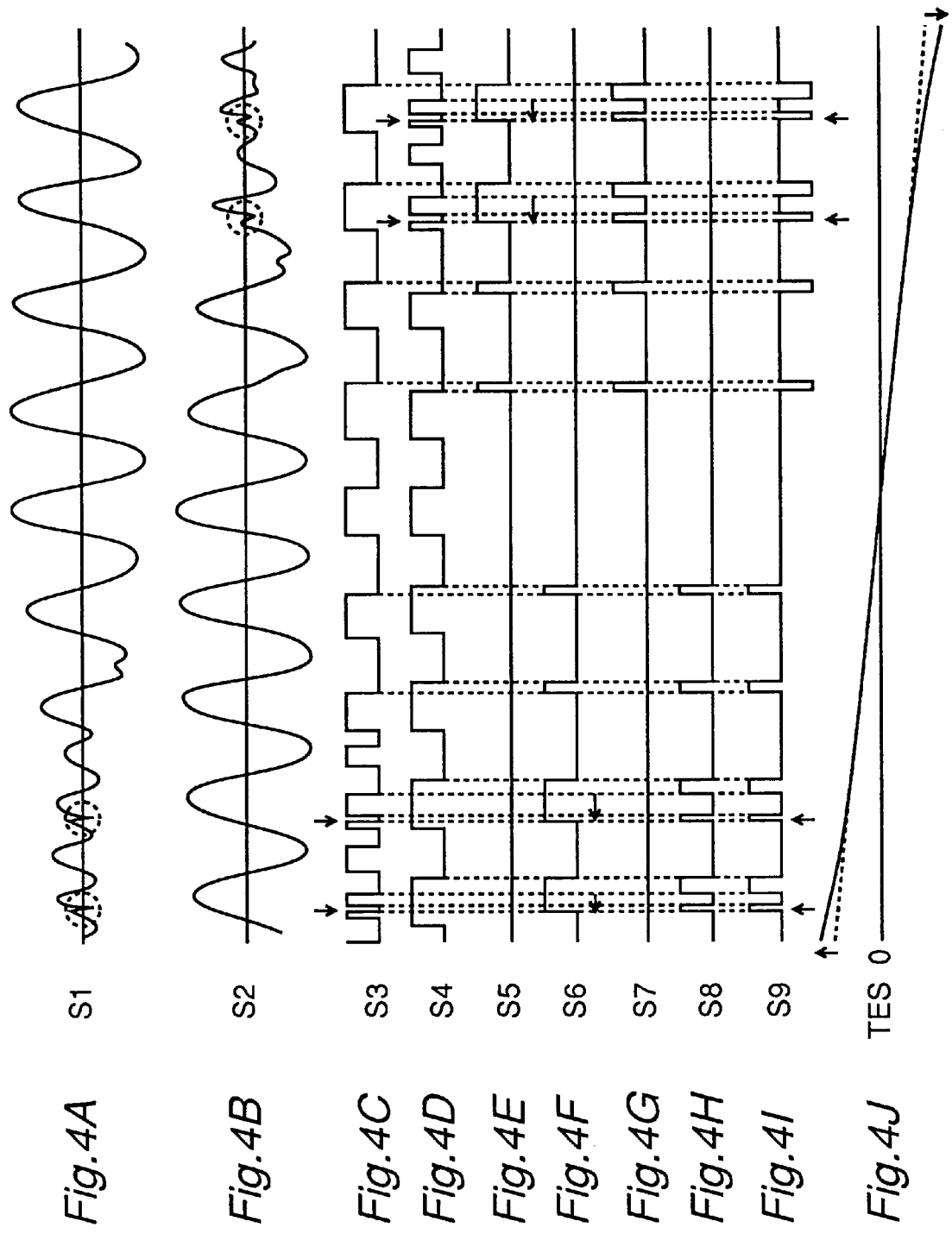
FIGS. 4A–4J are timing charts for showing operation timings of the circuit in FIG. 3.
Figure 5:
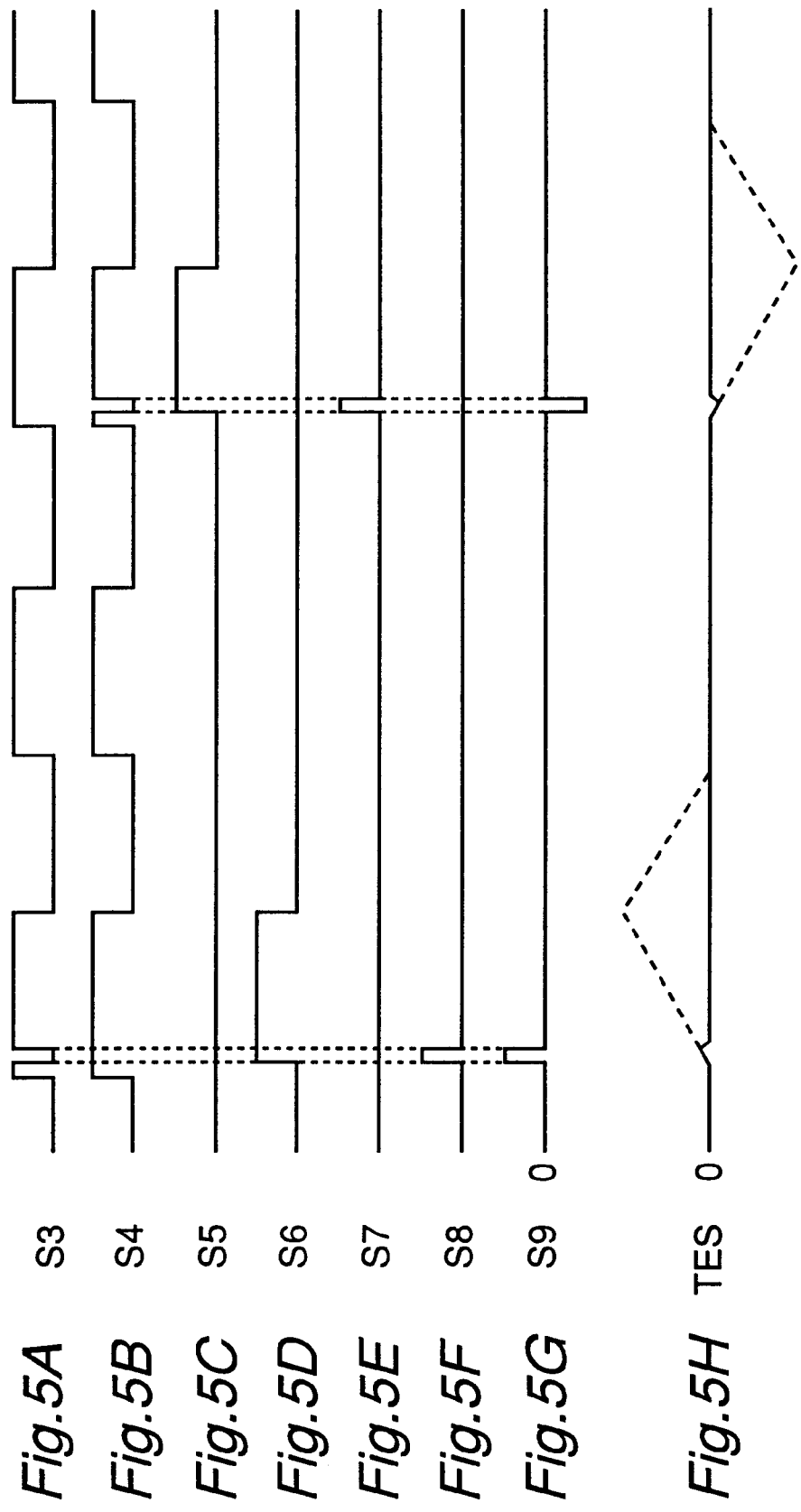
FIGS. 5A–5H are timing charts showing other operation timings of the circuit in FIG. 3.

FIGS. 4A–4J are timing charts showing operation timings of the circuit in FIG. 3. An operation of the circuit in FIG. 3 will be described below. Signals shown in FIGS. 4A–4J correspond to output signals S1–S9 and tracking error signal TES of various circuits in FIG. 3, respectively. FIGS. 4A and 4B show voltage signals S1 and S2 which are produced by converting the output signals of photo detector elements 2a and 2b by current-voltage converting portions 7a and 7b, respectively. It is assumed that waveform abnormalities (disturbances in a spike-like form), which cause a significant error of detection of the time difference in FIG. 29, occur at these voltage signals S1 and S2 as indicated in broken-line circles. In signals S3 and S4 produced by binarizing signals S1 and S2 by binarizing portions 8a and 8b, glitches occur at portions indicated by arrows similarly to FIGS. 29C and 29D. In pulse issuing portion 9 which detects the time difference (phase difference) from received signals S3 and S4, output signals S5 and S6 of D-FFs 92a and 92b have pulse widths which are increased in the direction indicated by arrows compared with the original pulse widths not affected by the glitches, similarly to the prior art already described. AND gates 93a and 93b each produce a logical product of each of output signals S5 and S6 of D-FFs 92a and 92b and each of clock inputs of D-FFs 92a and 92b, i.e., each of logically inverted signals S4 and S3. The difference between the logical product signals S7 and S8 thus produced is detected by difference detector 10, and is issued as pulse signal S9. In pulse signal S9 in FIG. 4I, the pulse width increases only to a suppressed extent corresponding to the glitches indicated by arrows in FIGS. 4C and 4D. Therefore, variation in tracking error signal TES, which is obtained by passing pulse signal S9 through LPF 11 and is represented by a solid line in FIG. 4J, can be suppressed and occurs only slightly compared with the signal which is represented by a broken line obtained if an erroneous detection due to glitches does not occur.

FIGS. 5A–5H are timing charts showing other operation timings of the circuit in FIG. 3. FIGS. 5A–5H show the operation timings of the circuit in FIG. 3 in such a case that the light spot accurately follows the row of information pits. FIGS. 5A–5H show signals S3–S9 and tracking error signal TES in FIG. 3, respectively.

Even if glitches similar to those shown in FIGS. 30A and 30B appears at output signals S3 and S4 (see FIGS. 5A and 5B) of binarizing portions 8a and 8b in FIG. 3, only pulses of the widths of the glitches appear at output signal S9 (see FIG. 5G) of difference detector 10. Therefore, a disturbance, which occurs at tracking error signal TES and is represented by a solid line in FIG. 5H, can be smaller than that represented by broken lines and caused in the prior art, so that an influence on the tracking servo-control can be suppressed.

Figure 6:
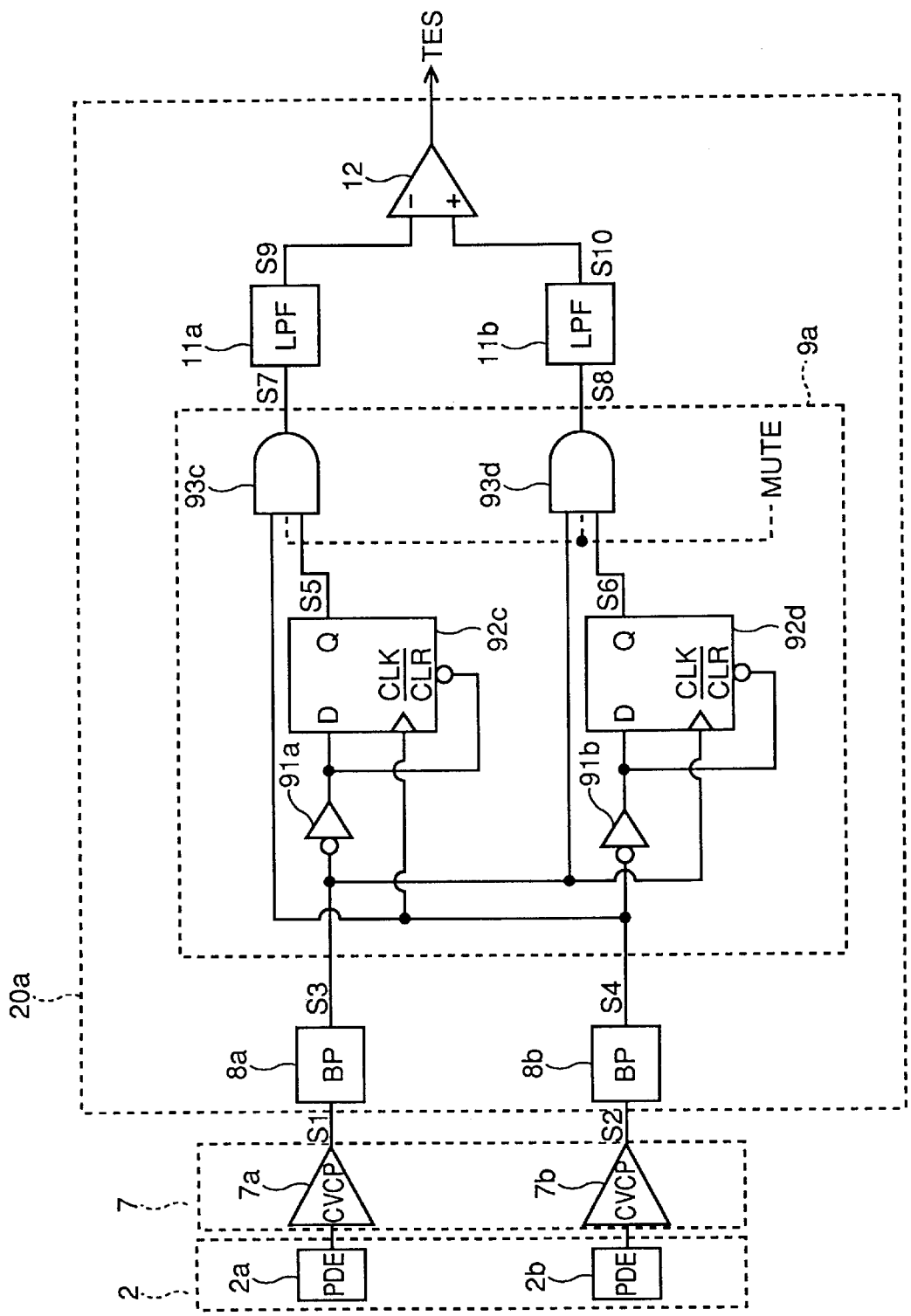
FIG. 6 shows another circuit structure of the signal processing circuit in FIG. 1.

FIG. 6 shows another example of the structure of the signal processing circuit in FIG. 1. Although signal processing circuit 20 in FIG. 3 has such a structure that detects the phase differences (time differences) in falling from level H to level L between signals S3 and S4, such a structure may be employed that detects rising from level L to level H as shown in FIG. 6. A signal processing circuit 20a in FIG. 6 differs from circuit 20 in FIG. 3 in that circuit 20a includes a pulse issuing portion 9a instead of pulse issuing portion 9, and also includes LPFs 11a and 11b as well as a differential amplifier 12 instead of difference detector 10 and LPF 11. Other structures of circuit 20a are similar to those of circuit 20. Pulse issuing portion 9a includes NOT gates 91a and 91b, D-FFs 92c and 92d, and AND gates 93c and 93d. NOT gates 91a and 91b receive and logically invert binary signals S3 and S4 for applying them to clear (CLR) input terminals of D-FFs 92c and 92d, respectively. In FIG. 3, as already described, pulse signals S7 and S8 are sent to and converted by difference detector 10 into pulse signal S9 which has positive and negative polarities and will be output as analog tracking error signal TES after passing through LPF 11. In contrast to this, pulse signals S7 and S8 in FIG. 6 issued from pulse issuing portion 9a are converted into analog signals S9 and S10 by LPFs 11a and 11b, and differential amplifier 12 obtains a difference between signals S9 and S10 for outputting it as tracking error signal TES.

FIGS. 7A–7K are timing charts showing operation timings of the circuit in FIG. 6. FIGS. 7A–7K show signals S1–S10 and tracking error signal TES in FIG. 6, respectively. When glitches indicated by arrows occur at binary signals S3 and S4 in FIGS. 7C and 7D due to disturbances encircled by broken lines in FIGS. 7A and 7B and occurring at voltages S1 and S2 which are obtained by converting the current signals sent from photo detector elements 2a and 2b in FIG. 6, output signals S5 and S6 of D-FFs 92c and 92d in FIGS. 7E and 7F have excessively large pulse widths, respectively. However, excessive pulses larger than the glitch width do not occur at signals S7 and S8 in FIG. 7G and 7H which represent logical products of signals S5 and S6 and the clocks (CLK) of D-FFs 92c and 92d, i.e., signals S4 and S3, respectively. Therefore, in output signals S9 and S10, shown in FIGS. 7I and 7J, of LPFs 11a and 11b as well as tracking error signal TES in FIG. 7K, variations due to occurrence of the glitches are suppressed as represented by solid lines, compared with the waveform which is exhibited when no glitch is present and is represented by broken lines.

FIGS. 8A–8I are timing charts showing other operation timings of the circuit in FIG. 6. FIGS. 8A–8I show the operation timings in the case where light spot 124 accurately follows the row of information pits 125. FIGS. 8A–8I show signals S3–S10 and signal TES in FIG. 6, respectively. Even if glitches similar to those in FIGS. 30A and 30B appear at output signals S3 and S4 of binarizing portion 8a and 8b, pulse output signals S7 and S8 of pulse issuing portion 9a in FIG. 6 have pulses corresponding only to the width of the glitch. Therefore, disturbances at output signals S9 and S10 of LPFs 11a and 11b as well as tracking error signal TES can be smaller, as represented by solid lines in FIGS. 8G–8I, than those in the prior art represented by broken lines. Therefore, light spot 124 can continuously and accurately follow the row of information pits 125.

In FIGS. 3 and 6, AND gates 93a–93d of pulse issuing portions 9 and 9a each may have three inputs, of which third input line is used as a signal line MUTE as represented by a broken line in the figure. This allows control of output of the pulses for producing tracking error signal TES. In FIGS. 3 and 6, when signal line MUTE is set, for example, to level L, outputs of AND gates 93a–93d are unconditionally fixed to level L, so that tracking error signal TES is not issued (i.e., signal TES is fixed to a level near 0 level). By utilizing this, issuance of tracking error signal TES can be stopped and, in other words, a so-called muting operation is allowed, for example, when pull-in of the focus servo is not completed and tracking error signal TES has no meaning. In FIGS. 3 and 6, each of AND gates 93a–93d may have three or more input lines for providing two or more muting input lines.

The structure in either of FIGS. 3 and 6 can have the muting function, without requiring an additional new element, only by increasing in number the inputs of the AND gate for suppressing excessive increase of the width of the time difference (phase difference) pulse which may be caused by the glitch.

Figure 9:
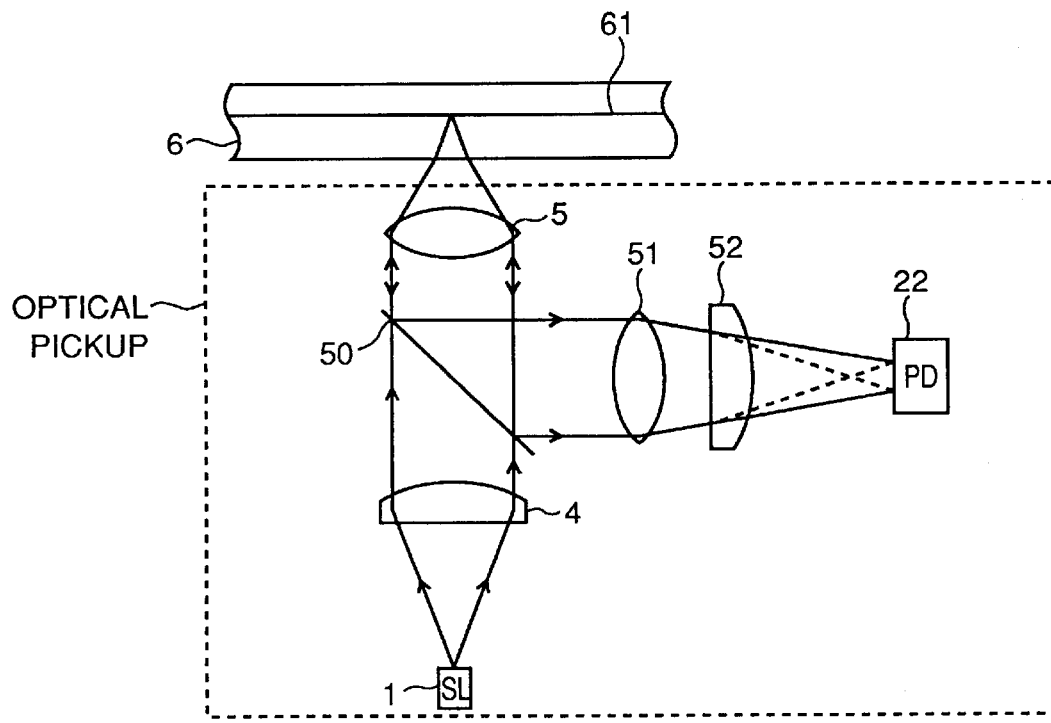
FIG. 9 schematically shows another structure of an optical pickup applied to the tracking control device of the invention.

The optical pickup suitable to the tracking control device of this embodiment is not restricted to the structure, which has the hologram unit having three divided regions as shown in FIG. 1 and the two photo detectors for detecting the tracking error signal, and uses the Foucault method for detecting the focus error signal. FIG. 9 schematically shows another structure of the optical pickup which can be applied to the tracking control device according to the invention. The optical pickup in FIG. 9 uses a photo detector 22 which is divided into four regions having crossed boundaries, and an astigmatism method is used for detecting the focus error signal. The optical pickup in FIG. 9 includes light source 1, photo detector 22, collimator lens 4, objective lens 5, a half mirror 50, a convex lens 51 and a cylindrical lens 52. In an operation, the light beam emitted from light source 1 is converted into parallel light beams by collimator lens 4, passes through half mirror 50 and is converged by objective lens 5. Thereby, the light beam is radiated onto information record surface 61, forming minute light spot 124. The light beam reflected on optical disk 6 passes through objective lens 5, and its light path is directed rightward in the figure by half mirror 50. The light beam then passes through convex lens 51 and cylindrical lens 52 to form the converged light beams having two focus points in the axial direction, which is a distinctive feature of the astigmatism method, and reaches photo detector 22. On the path from convex lens 51 to photo detector 22, the light beam represented by solid lines is not converged by cylindrical lens 52 and travel in the axial direction, and the light beam represented by broken lines is converged by cylindrical lens 52 and travel in the axial direction. There are well known in the astigmatism method, and therefore will not be described below more in detail.

Figure 10:
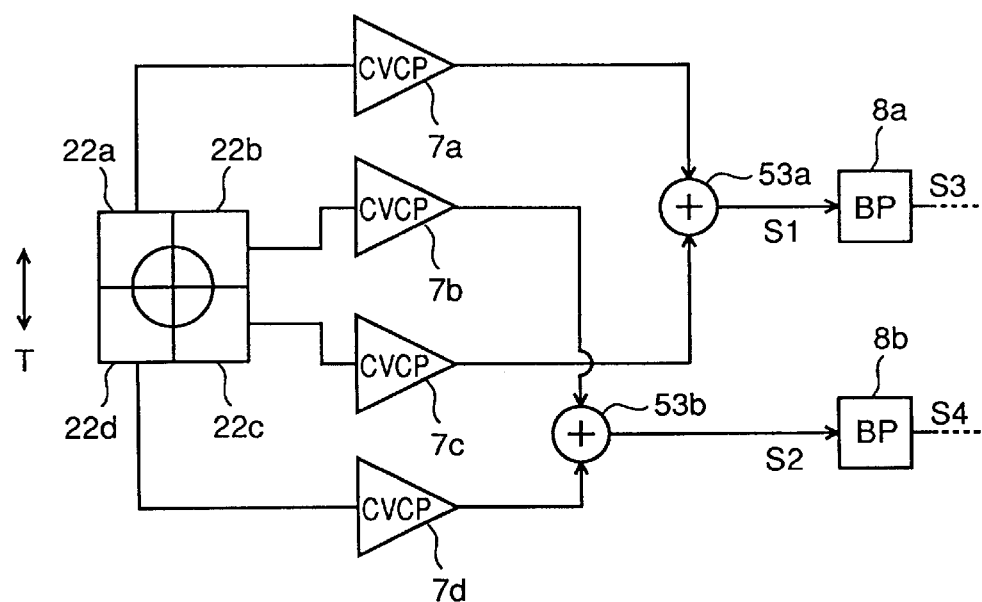
FIG. 10 shows a connection structure related to the photo detector in the structure including the tracking control device of the invention applied to the optical pickup in FIG. 9.

FIG. 10 shows a connection structure for the photo detector related to the tracking control device of the invention applied to the optical pickup in FIG. 9.

Figures 24A, 24B:
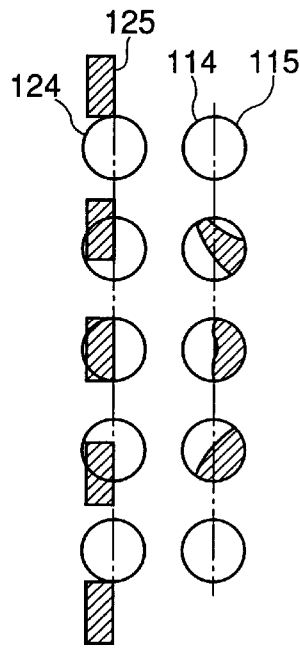
FIGS. 24A and 24B schematically show first example of a variation in farfield pattern caused by relative position between a light spot and information pits in the prior art and the embodiments of the invention.
Figures 25A, 25B:
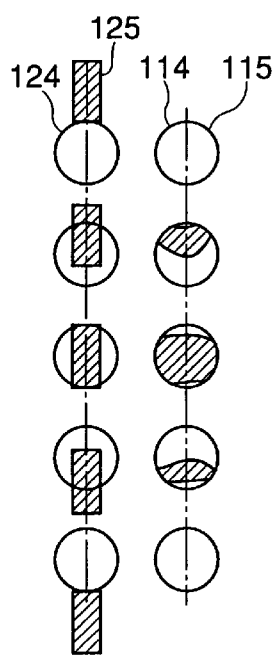
FIGS. 25A and 25B schematically show second example of a variation in farfield pattern caused by a relative position between a light spot and information pits in the prior art and the embodiments of the invention.
Figure 31A:
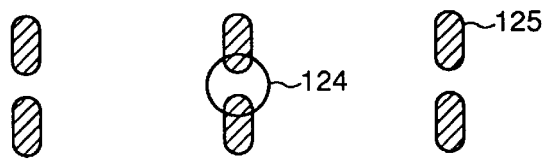
FIGS. 31A and 31B show a relation between the light spot and the tracks in the prior art and the embodiments of the invention together with the tracking error signal waveform.
Figure 31B:
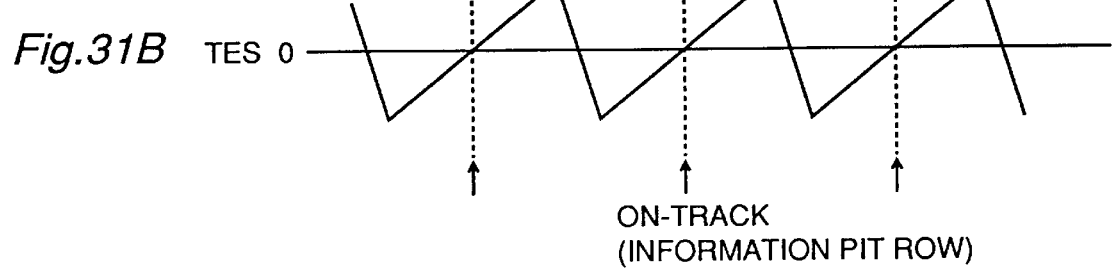
Figure 32A:
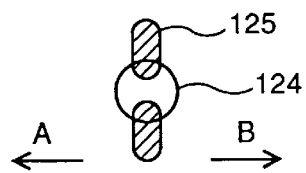
FIGS. 32A and 32B show a relation between the tracking error signal and the driving direction of the light spot required for the tracking servo-control in the prior art and the embodiments of the invention.
Figure 32B:
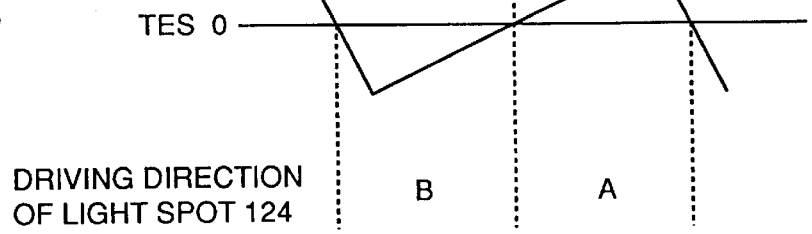
Figure 34A:
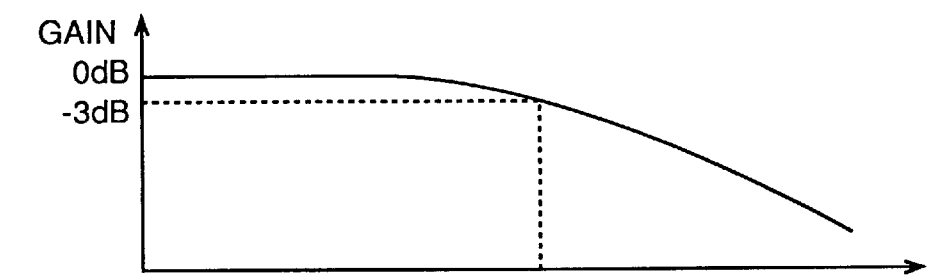
FIGS. 34A and 34B show frequency characteristics of the gain and the phase of a conventional primary LPF, respectively.
Figure 34B:
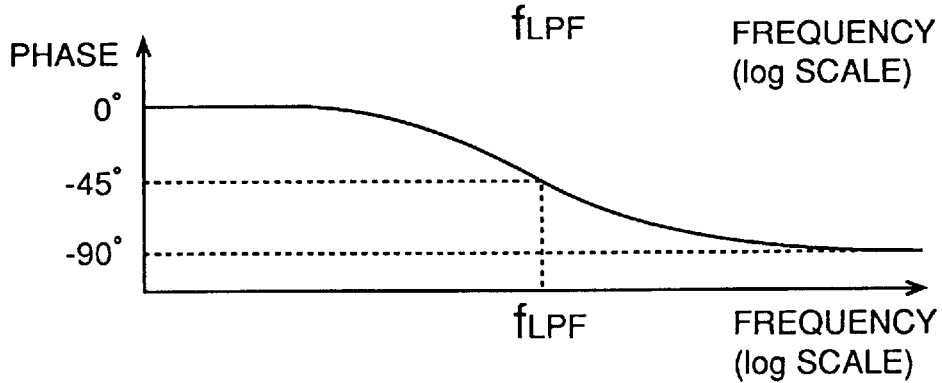
Figure 35A:
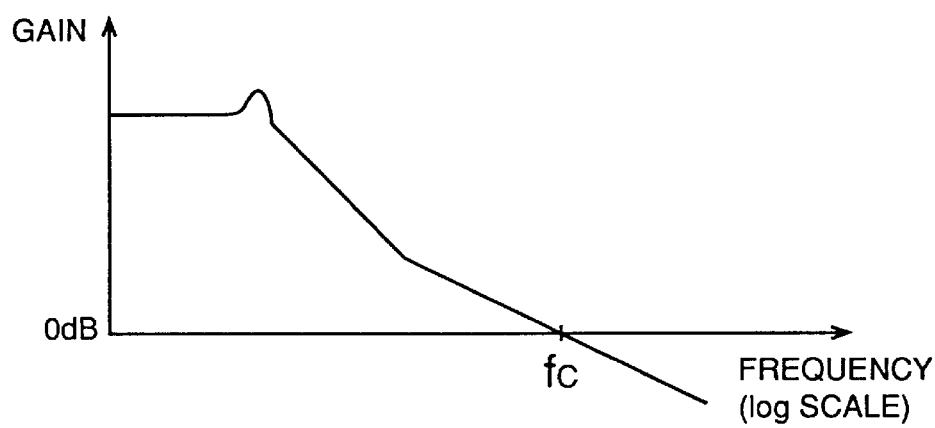
FIGS. 35A and 35B show frequency characteristics of the gain and the phase of the conventional tracking servo-control system, respectively.
Figure 35B:
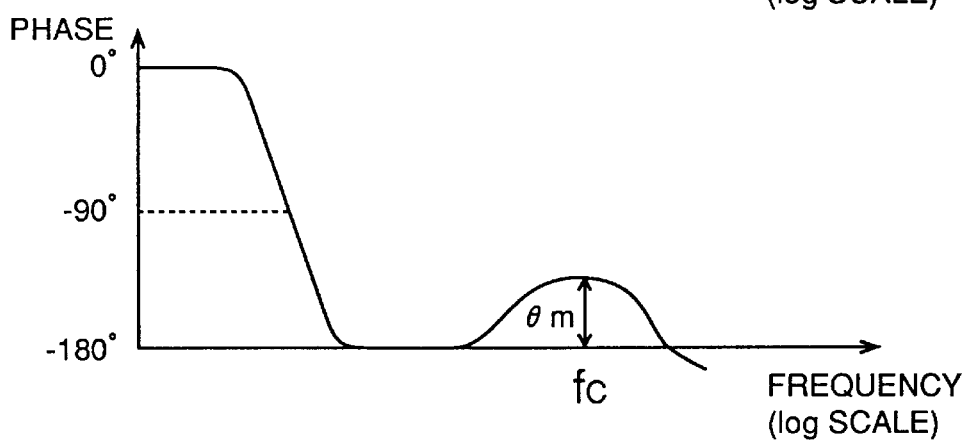

In FIG. 10, arrow T indicates a direction of a length (advancing direction) of an information track (row of information pits) with respect to entry of the light beams reflected from optical disk 6 into photo detector 22. The diffraction pattern of light beams, which appear when light spot 124 passes over information pit 125, and, in other words, the farfield pattern tends to appear obliquely with respect to the length direction of the track as shown in FIGS. 24B or 26B as light spot 124 is shifted leftward or rightward from the center of row (track) of information pits 125. Therefore, photo detector 22 having quartered photo detector elements may be operated by combining the outputs of the photo detector elements aligned obliquely to the track, i.e., the diagonally opposed photo detector elements. In FIG. 10, photo detector 22 has quartered photo detector elements 22a, 22b, 22c and 22d having crossed boundaries, and current signals corresponding to quantities of incident light at the photo detector elements are converted into voltage signals by current-voltage converting portions 7a, 7b, 7c and 7d and are issued therefrom, respectively. Thereafter, an adder 53a obtains a sum of the outputs of current-voltage converting portions 7a and 7c, and an adder 53b obtains a sum of the outputs of current-voltage converting portions 7b and 7d. In this manner, addition of the signals obtained from the diagonally opposed photo detector elements is performed, and the results of the addition are applied as input signals to binarizing portions 8a and 8b in FIG. 3 or 6. Therefore, tracking error signal TES can be obtained similarly to the optical pickup in FIG. 1. Similarly to the structure in FIG. 3 or 6, each of current-voltage converting portions 7a–7d in FIG. 10 may have an appropriate amplification degree, if necessary.

Second Embodiment

A second embodiment will be described below. In the second embodiment, a tracking control device can control the tracking servo operation and track traversing operation of the optical pickup in the optimum manner.

Figure 11:
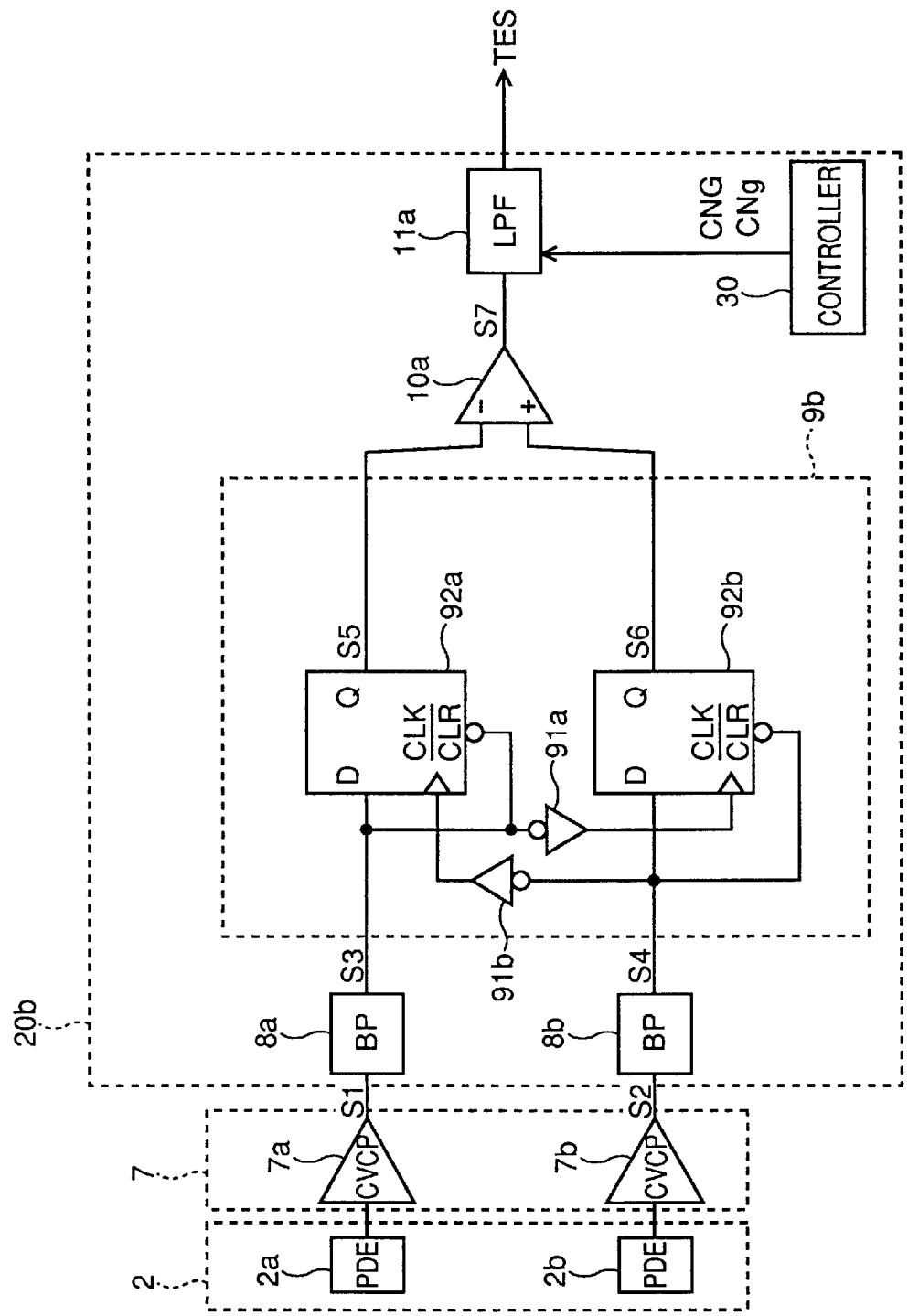
FIG. 11 shows an example of a structure of a signal processing circuit producing a tracking error signal in a second embodiment of the invention.

FIG. 11 shows an example of a structure of a signal processing circuit for producing a tracking error signal according to the second embodiment of the invention. A signal processing circuit 20b in FIG. 11 differs from signal processing circuit 20 in FIG. 3 in that circuit 20b is additionally provided with a controller 30, and pulse issuing portion 9, differential detector 10 and LPF 11 in circuit 20 are replaced with pulse issuing portion 9b, differential detector 10a and LPF 11a, respectively.

Controller 30, which is formed of a microcomputer and others, controls the tracking servo operation and track traversing operation, and also controls an operation of a spindle motor rotating the disk, i.e., information record medium, decoding of reproduced signal RF which is read out, error correction and other operations of unillustrated portions. Controller 30 operates in the signal processing circuit to switch the time constant (pole frequency $f_{LPF}$) of the LPF using the level of a signal CNG or CNg.

Pulse issuing portion 9b in FIG. 11 includes NOT gates (logic inversion circuits) 91a and 91b as well as D-FFs 92a and 92b for receiving output signals of binarizing portions 8a and 8b and issuing pulses in accordance with the time differences (phase differences) between these signals. Pulse issuing portion 9b detects the time difference (phase difference) in falling from level H to level L related to each of output signals S3 and S4 sent from binarizing portions 8a and 8b, and issue pulses S5 and S6, respectively.

Difference detector 10a detects the difference between pulse outputs S5 and S6 sent from pulse issuing portion 9b, and produces phase difference pulse S7 having both the positive and negative polarities. LPF 11a averages (smooths) phase difference pulse S7 sent from difference detector 10a, and issues analog tracking error signal TES. LPF 11a has primary characteristics, and pole frequency $f_{LPF}$ thereof can be switched in accordance with level H and level L of signal CNG or CNg applied from controller 30.

FIGS. 12A and 12B show a relation between the time constant of the LPF, which averages the phase difference pulse in the circuit shown in FIG. 11, and the waveform of tracking error signal TES exhibited when the light spot traverses the tracks. More specifically, FIGS. 12A and 12B show waveforms of tracking error signal TES in such a case that the speed of the light spot traversing the tracks gradually increases or the repetition frequency of the tracking error signal gradually increases. FIG. 12A shows the waveform exhibited when pole frequency $f_{LPF}$ of LPF 11a is set to a high value by signal CNG, and FIG. 12B shows the waveform exhibited when pole frequency $f_{LPF}$ of LPF 11a is set to a low value by signal CNG. According to signal TES in FIG. 12A, a large disturbance occurs at the waveform when light spot 124 is located between the tracks, but a shift or deviation of the zero-cross point on the track is small even when the traversing speed increases, so that an error of the direction determination is unlikely to occur when combined with signal RF. Therefore, this waveform is suitable to the track search, which is performed by traversing a large number of tracks, among several track traversing operations of the light spot. According to signal TES in FIG. 12B, the shift of the zero-cross point increases and the amplitude decreases with increase in speed of the light spot traversing the tracks. However, the shift of the zero-cross point is small and the disturbance at the waveform is small while the traversing speed is not high. Therefore, the detection of the position between the tracks can be performed with zero-cross in the direction opposite to that of the detection of the position on the track, so that this waveform is suitable to the track jump, in which the light spot traverses one or several tracks a time.

Therefore, it is desired to switch pole frequency $f_{LPF}$ of LPF 11a to a high value for the track search performed by traversing a large number of tracks, switch the same to a low value for the track jump performed by traversing a small number of tracks.

For performing this switching, the number of the tracks which the light spot traverses is set to a predetermined value, which can reduce the shift of the zero-cross point and the disturbance at the waveform of signal TES in such a state that the light spot is located between the tracks.

FIGS. 13A–13G show a relation between the time constant of the LPF in the circuit shown in FIG. 11 and the disturbance at the tracking error signal in the case where an abnormal phase difference pulse occurs due to a defect in the disk during the tracking servo operation. FIGS. 13A–13G show operation timings during the tracking servo-control for moving light spot 124 to follow the row of information pits 125. It is now assumed that a defect or the like at the disk disturbs the incident light beams of photo detector elements 2a and 2b, and the influence taking the form of glitch appears on output signals S3 and S4 of binarizing portions 8a and 8b at the downstream stage. Due to the glitches, pulses having excessively large widths appear at phase difference pulses S5 and S6 as shown in FIGS. 13C and 13D. FIG. 13F shows tracking error signal TES in the case where pole frequency $f_{LPF}$ is high (time constant is small), and FIG. 13G shows tracking error signal TES in the case where pole frequency $f_{LPF}$ is low (time constant is large). In FIG. 13F, since pole frequency $f_{LPF}$ is high, phase difference pulses S5 and S6 having the excessively large widths cannot be averaged sufficiently, so that signal TES is disturbed to a large extent. Meanwhile, the averaging is performed sufficiently in FIG. 13G, so that the disturbance at signal TES is suppressed. For the tracking servo operation related to the defect and others at the disk, therefore, it is desired to lower pole frequency $f_{LPF}$ of LPF 11a (increase the time constant) within a range allowing reduction in phase margin.

As can be understood from the above, controller 30 controls signal CNG (CNg) such that pole frequency $f_{LPF}$ of LPF 11a is low during the tracking servo operation and the track jump performed by jumping one or several tracks provided that a sufficient phase margin can be ensured, and that pole frequency $f_{LPF}$ is high during the track search performed by traversing a large number of tracks. Thereby, disturbance of tracking error signal TES, which may be caused by defects or the like at the disk, can be suppressed during the tracking servo operation, and deterioration in control accuracy is also suppressed. Further, in the track search performed by traversing many tracks, the phase lag (time lag) of tracking error signal TES can be small, and error in determination of the track traversing direction can be reduced. In the track jump for one or several tracks, the midpoint between the tracks can be detected from tracking error signal TES, and the accurate track jump can be easily performed. Therefore, by controlling pole frequency $f_{LPF}$ of LPF 11a with signal CNG (CNg) issued from controller 30, it is possible to satisfy both the control accuracy of the tracking servo operation and the accuracy of the track traversing operation. Thereby, it is possible to provide an ideal system satisfying all the requirements already described in connection with the prior art, i.e., (1) stability in the tracking servo-control system, (2) accuracy in the direction determination during the track search, (3) control accuracy in the tracking servo with respect to defects or the like at the disk, and (4) detection of the midpoint between the tracks during the track jump.

Even if a sufficiently large phase margin cannot be ensured for LPF 11a, setting similar to the above can be employed such that pole frequency $f_{LPF}$ of LPF 11a is high for the tracking servo operation and the track search operation performed by traversing many tracks, and is low for the track jump performed by traversing one or several tracks. In this case, it is impossible only to reduce the deterioration of the control accuracy during the tracking servo operation, which may be caused by defects or the like at the disk. However, intended accuracies can be achieved in the track search performed by traversing many tracks and the track jump performed by traversing several tracks. Thus, it is possible to provide the system which can satisfy three items among the foregoing four items (1)–(4) at the same time.

If pole frequency $f_{LPF}$ is reduced to an extent sufficiently allowing detection of the midpoint between the tracks during the track jump, a problem relating to reduction in phase margin may arise. However, in the system allowing reduction in phase margin if it is small, a structure may employ pole frequency $f_{LPF}$ which is switchable among high, middle and low values so that it is switched to the high value for the track search, the middle value for the tracking servo-control operation and the low value for the track jump. In this case, the item (3) among the foregoing items (1)–(4) can be also satisfied while suppressing the deterioration in the item (1), and therefore it is possible to provide a preferable system.

Figure 14A:
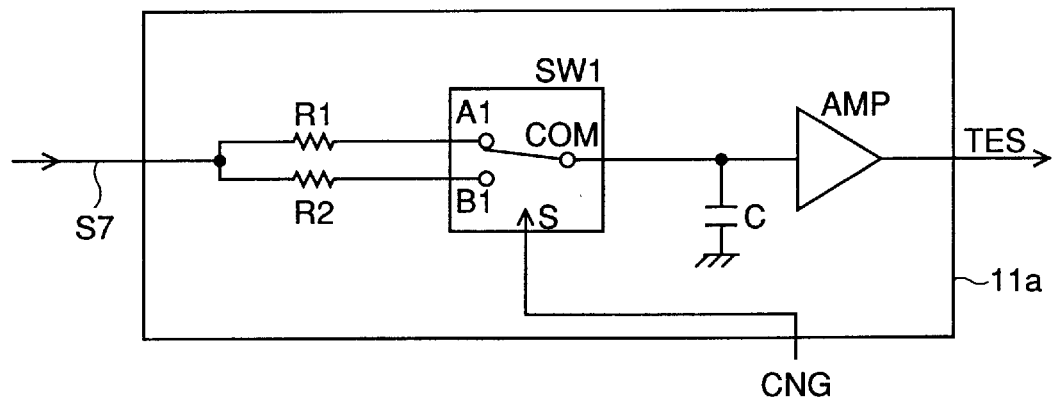
FIGS. 14A and 14B show a first example of the circuit structure of the LPF in FIG. 11.

FIGS. 14A and 14B through FIGS. 18A and 18B show first to fifth examples of the circuit structure of the LPF in FIG. 11. These figures show specific examples of the circuit structure of LPF 11a, in which the time constant or pole frequency $f_{LPF}$ is switched by signal CNG or CNg applied from controller 30. In FIG. 14A, the first example of LPF 11a includes a capacitor C, resistors R1 and R2, an analog switch SW1 and a buffer amplifier AMP. Buffer amplifier AMP has an amplification degree of +1, but may have the amplification degree of another appropriate value. Analog switch SW1 includes terminals A1 and B1 as well as a common terminal COM. Terminal A1 is connected to an end of resistor R1, and terminal B1 is connected to an end of resistor R2. Resistors R1 and R2 are supplied on their other ends with phase difference pulse S7 from difference detector 10a. Common terminal COM of analog switch SW1 is connected to an end of capacitor C, of which other end is grounded, and is also connected to an input terminal of buffer amplifier AMP. The terminal voltage of capacitor C is buffered by buffer amplifier AMP, and is issued as tracking error signal TES. A control line S of analog switch SW1 is supplied with signal CNG instructing switching of pole frequency $f_{LPF}$. Analog switch SW1 connects the resistor R1 (terminal A1) to terminal COM when signal CNG is at level H, and connects resistor R2 (terminal B1) to terminal COM when signal CNG is at level L. Resistor R1 has a resistance value smaller than that of resistor R2.

When signal CNG is at level H, phase difference pulse S7 is applied to capacitor C through resistor R1 and analog switch SW1. Therefore, capacitor C is charged and discharged by phase difference pulse S7 with the time constant (R1·C), and the phase difference pulse S7 is averaged into the analog voltage, which is applied to amplifier AMP. When signal line CNG is at level L, phase difference pulse S7 charges and discharges capacitor C with the time constant (R2·C) through resistor R2 and analog switch SW1.

Since the resistance value of resistor R1 is smaller than that of resistor R2, the time constant (R1·C) is smaller than the time constant (R2·C), so that pole frequency $f_{LPF1}$ (see formula (1)) is high in the case of the time constant (R1·C), and pole frequency $f_{LPF2}$ (see formula (2)) is low in the case of the time constant (R2·C).

$$f_{LPF1}=1/(2\pi R1 \cdot C) \quad (1)$$

$$f_{LPF2}=1/(2\pi R2 \cdot C) \quad (2)$$

In this manner, it is possible to provide LPF 11a in which the time constant or pole frequency $f_{LPF}$ can be switched by the level of signal CNG. Resistance values of resistors R1 and R2 can be easily set to be sufficiently higher than the ON resistance (generally tens to hundreds of ohms) of analog switch SW1. Alternatively, the ON resistance can be easily designed in the form included in resistors R1 and R2. Therefore, the influence by the addition in series of the ON resistance of analog switch SW1 to resistors R1 and R2, which may cause variation in time constant, can be ignorably small.

Figure 14B:
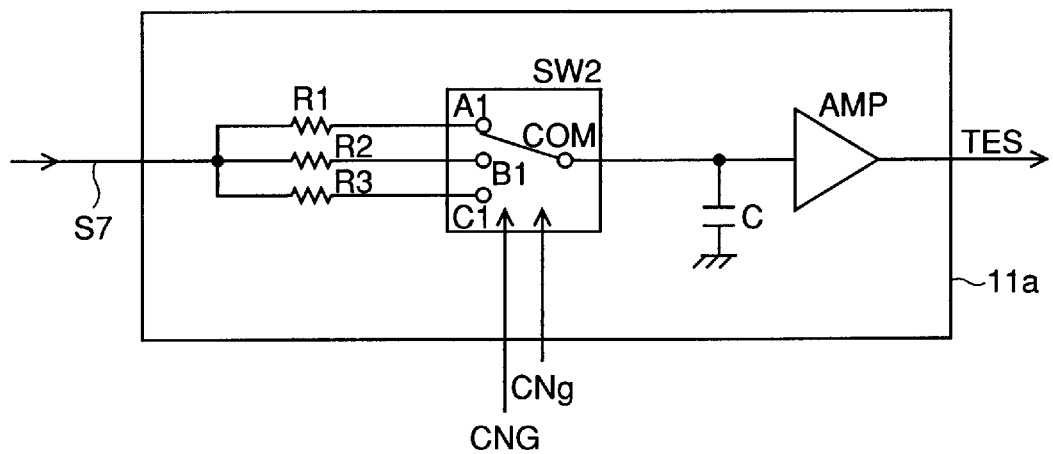

Pole frequency $f_{LPF}$, which is switchable between the two stages, i.e., high and low stages in FIG. 14A, may be switchable among the three stages, i.e., high, middle and low stages, which can be achieved by employing a structure shown in FIG. 14B. The structure in FIG. 14B can be formed by modifying the structure in FIG. 14A such that a resistor R3 is add to the structure in FIG. 14A and analog switch SW1 in FIG. 14A is replaced with an analog switch SW2 to be connected selectively to common terminal COM and terminals A1, B1 and C1. The resistance values in FIG. 14B are set to satisfy the relationship of (R1<R2<R3). Thereby, pole frequency $f_{LPF3}$ expressed by the following formula (3) is set when analog switch SW2 selects resistor R3, so that the relationship of $f_{LPF1}>f_{LPF3}>f_{LPF2}$ is established.

$$f_{LPF3}=1/(2\pi R3 \cdot C) \quad (3)$$

Since the analog switch SW2 is switchable among three stages, signals CNG and CNg are used. Signal levels of signals CNG and CNg can be combined together in an arbitrary manner. For example, the following manner may be employed. When signal CNg is at level L, resistor R1 or R2 is selected in accordance with level H or level L of signal CNG. When signal CNg is at level H, resistor R3 is unconditionally selected.

Figure 15A:
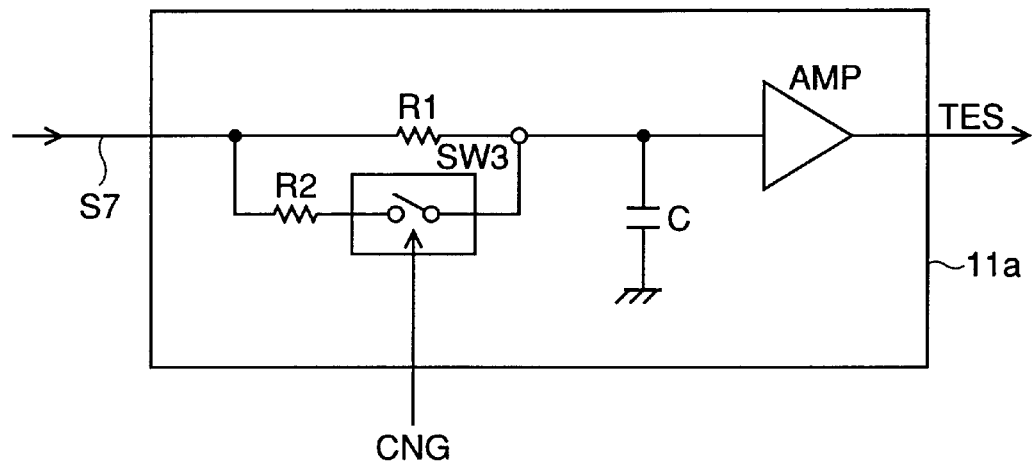
FIGS. 15A and 15B show a second example of the circuit structure of the LPF in FIG. 11.
Figure 15B:
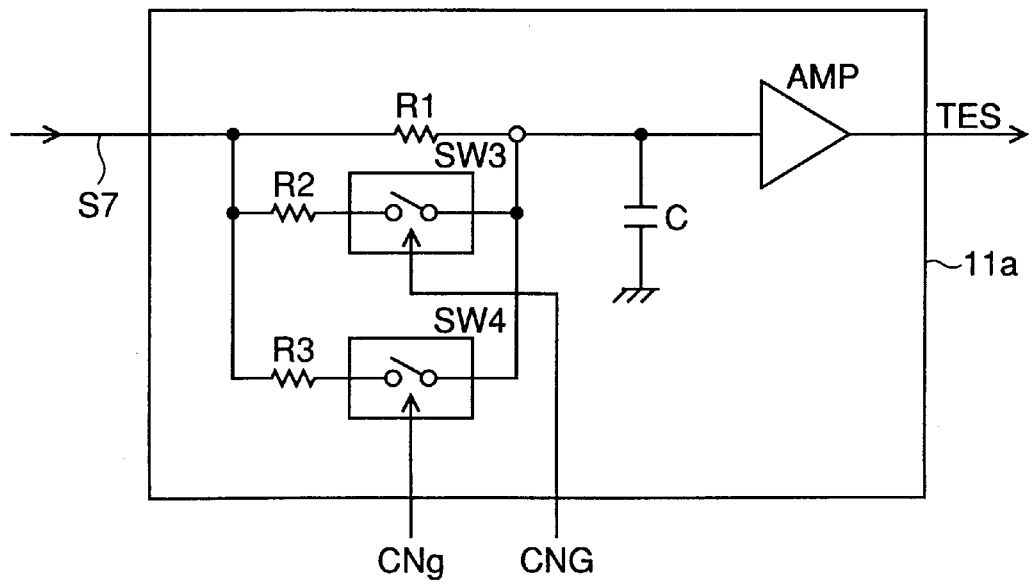

FIGS. 15A and 15B show the second example of the circuit structure of LPF 11a in which the time constant or pole frequency $f_{LPF}$ is switchable. The structure in FIG. 15A differs from that in FIG. 14A in the relationship of the analog switch with respect to resistors R1 and R2. In FIG. 14A, analog switch SW1 connects capacitor C selectively to resistors R1 and R2. Meanwhile, in the structure in FIG. 15A, resistor R1 is always connected to capacitor C to determine the time constant which averages phase difference pulse S7. Resistor R2 is connected in parallel with resistor R1 by turning on analog switch SW3. Analog switch SW3 is turned on when signal CNG is at level H, and is turned off when it is at level L. The time constant goes to (R1·R2·C/(R1+R2)) when signal CNG is at level H, and goes to (R1·C) when it is at level L. Pole frequency $f_{LPF}$ goes to high pole frequency $f_{LPF}$, expressed by the formula (4) when the time constant is set to the former, and goes to pole frequency $f_{LPF2}$ expressed by the formula (5) when it is set to the latter.

$$f_{LPF1}=1/(2\pi R1\cdot R2\cdot C/(R1+R2)) \quad (4)$$

$$f_{LPF2}=1/(2\pi R1\cdot C) \quad (5)$$

In FIG. 15A, analog switch SW3 may be of a simple ON/OFF type. The ON resistance of analog switch SW3 may be designed in the form included in resistor R2, or resistors R1 and R2 may be designed to have sufficiently large values, whereby an influence by the ON resistance can be ignored.

In FIG. 15A, for providing pole frequency $f_{LPF}$ which is switchable among the three, i.e., high, middle and low stages, the structure is additionally provided with an analog switch SW4 similar to analog switch SW3 as well as signal CNg for controlling analog switch SW4 as shown in FIG. 15B. When signal CNG is at level H and signal CNg is at level L, analog switch SW3 is on and switch SW4 is off, so that pole frequency $f_{LPF}$ is equal to the value obtained by the foregoing formula (4). When signal CNG is at level L and signal CNg is at level H, analog switch SW3 is off and switch SW4 is on, so that pole frequency $f_{LPF}$ is equal to a pole frequency $f_{LPF3}$ obtained by the following formula (6).

$$f_{LPF3}=1/(2\pi R1\cdot R3\cdot C/(R1+R3)) \quad (6)$$

When both signals CNG and CNg are at level L, analog switches SW3 and SW4 are off, so that pole frequency $f_{LPF}$ can be obtained as pole frequency $f_{LPF2}$ by the foregoing formula (5).

Therefore, by setting the value of resistor R3 to satisfy the relation of R3>R2, the relationship of ($f_{LPF1}$>$f_{LPF3}$>$f_{LPF2}$) is established similarly to the case in FIG. 14B, so that the pole frequency or the time constant can be switched among the three stages.

When signals CNG and CNg are at level H, analog switches SW3 and SW4 are ON, so that pole frequency or the time constant can be switched among the four stages. It will not be described in detail.

Figure 16A:
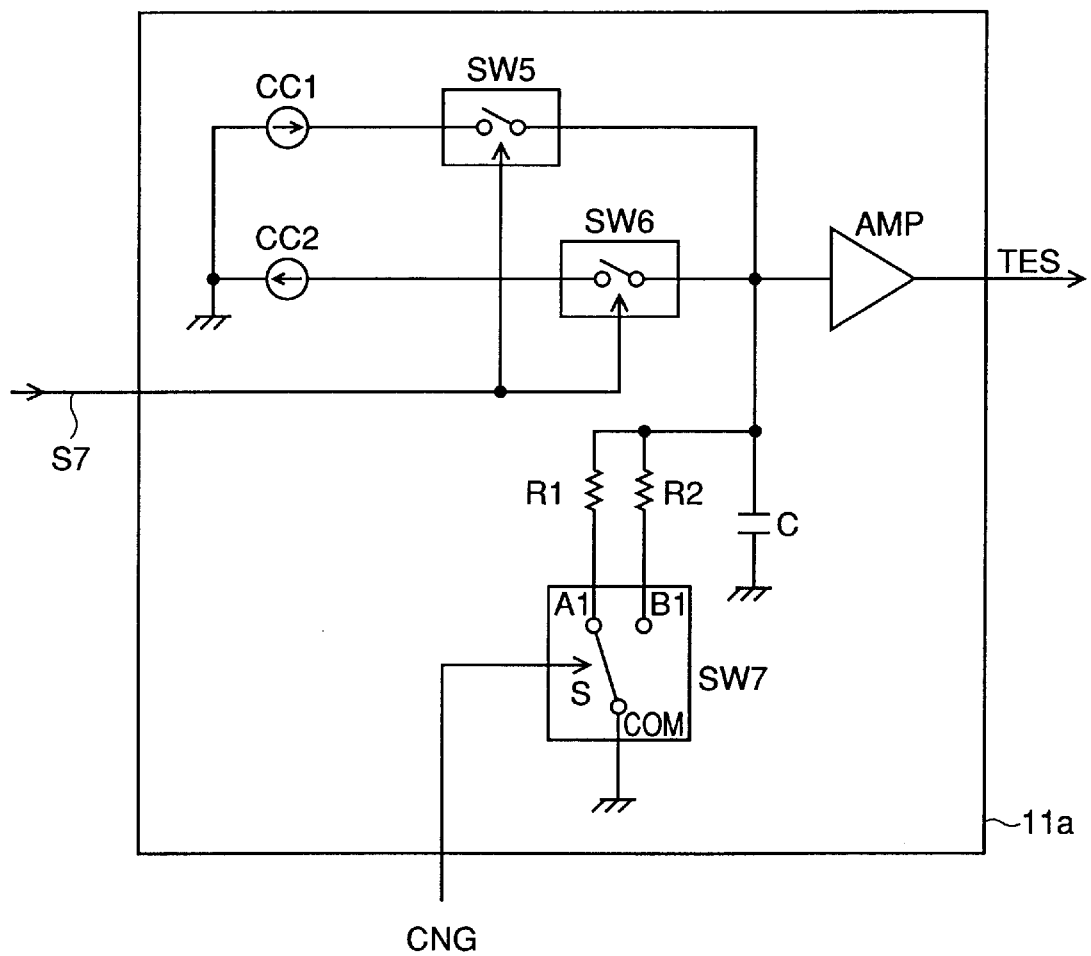
FIGS. 16A and 16B show a third example of the circuit structure of the LPF in FIG. 11.
Figure 16B:
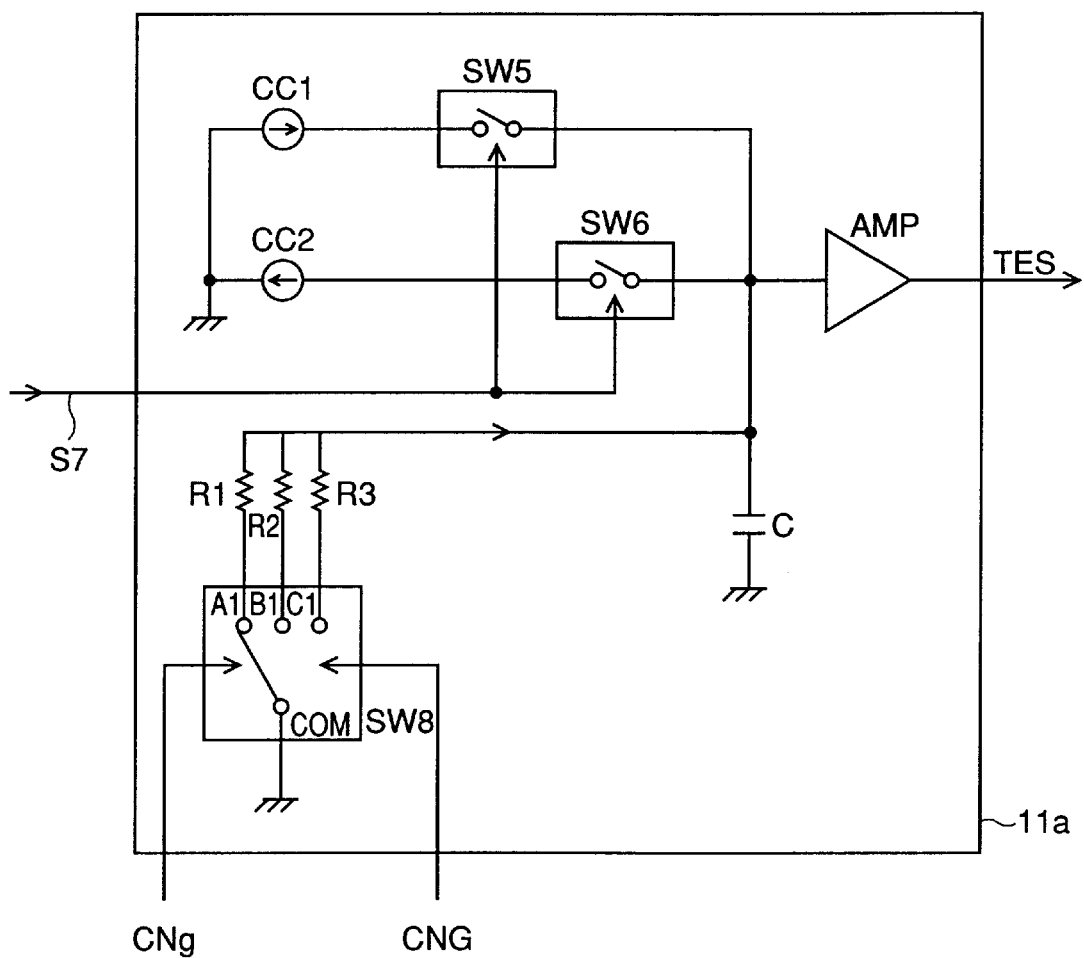

FIGS. 16A and 16B show a third example of the circuit structure of LPF 11a. In FIG. 16A, LPF 11a includes constant current sources CC1 and CC2, analog switches SW5, SW6 and SW7, capacitor C, resistors R1 and R2, and buffer amplifier AMP. Constant current sources CC1 and CC2 are connected through analog switches SW5 and SW6 to capacitor C having a grounded end, respectively, and supply currents, which are equal in absolute value to each other and have opposite polarities, to capacitor C. The terminal voltage of capacitor C is buffered by buffer amplifier AMP and is output as tracking error signal TES. Capacitor C is also connected to one end of each of resistors R1 and R2, which have the other ends to be selectively grounded by analog switch SW7.

Analog switches SW5 and SW6 are turned on/off by phase difference pulse S7 having the positive and negative polarities. More specifically, when phase difference pulse S7 is positive, switch SW5 is on. When pulse S7 is negative, switch SW6 is on. When phase difference pulse S7 is at 0 level, switches SW5 and SW6 are off.

Since analog switch SW7 is supplied with signal CNG, discharging of capacitor C is performed through resistor R1 when signal CNG is at level H, and is performed through resistor R2 when signal CNG is at level L.

In FIG. 16A, constant current sources CC1 and CC2 charge capacitor C positively and negatively in accordance with the positive and negative of phase difference pulse S7, respectively. When phase difference pulse S7 is at 0 level, capacitor C is discharged through either resistor R1 or R2. The time constant of charging/discharging of capacitor C can be switched by the level of signal CNG. More specifically, in the state that the resistance values exhibit the relation of R1<R2, the time constant of charging/discharging of capacitor C is small when signal CNG is at level H, and the time constant is large when it is at level L. Calculation of the pole frequency based on the time constant is performed in the same manner expressed by the foregoing formulas for the circuit structure in FIG. 14A. Switching of pole frequency $f_{LPF}$ among three stages can be achieved by employing the structure in FIG. 16B similar to the structure and method already described with reference to FIG. 14B. The structure in FIG. 16B differs from that in FIG. 16A in that resistor R3 is additionally employed, analog switch SW7 in FIG. 16A is replaced with an analog switch SW8 for selecting resistors R1, R2 and R3, and signal CNg is additionally employed for operation together with signal CNG.

Figure 17A:
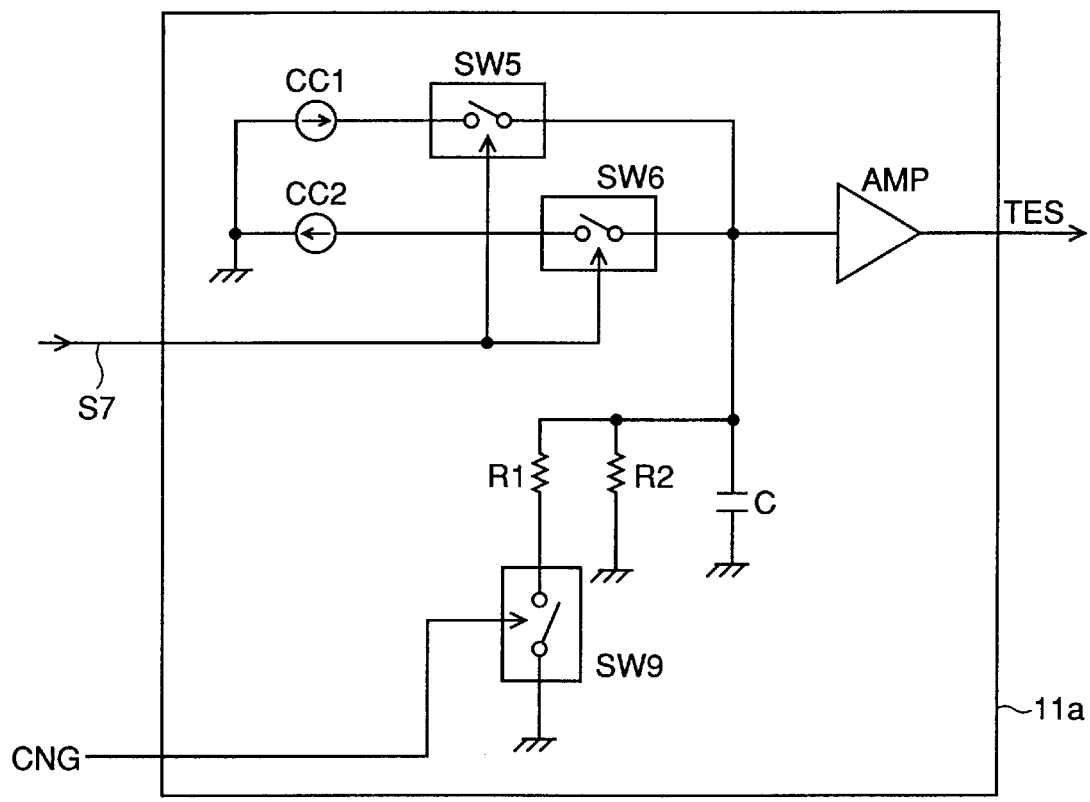
FIGS. 17A and 17B show a fourth example of the circuit structure of the LPF in FIG. 11.
Figure 17B:
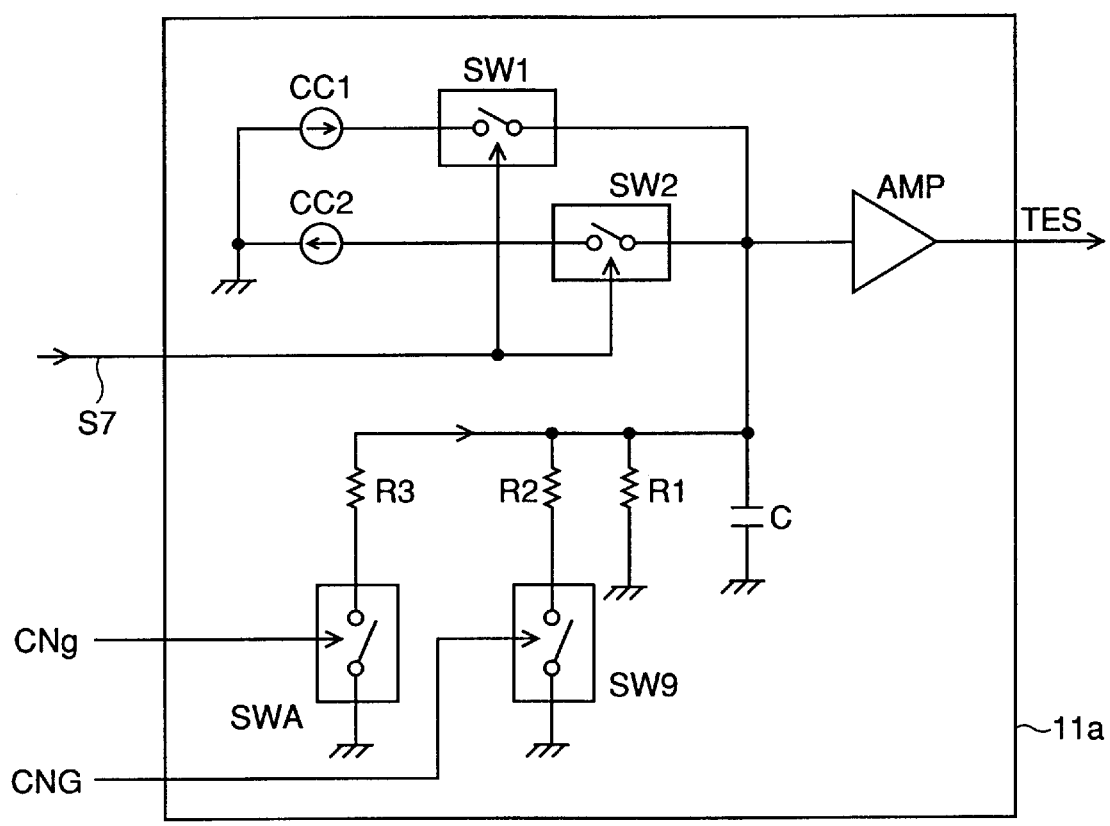

The fourth example in FIGS. 17A and 17B may be employed as another structure of LPF 11a employing the constant current source. LPF 11a in FIG. 17A includes constant current sources CC1 and CC2, analog switches SW5, SW6 and SW9, resistors R1 and R2, capacitor C and buffer amplifier AMP. Constant current sources CC1 and CC2 supply currents of the same absolute value and opposite polarities to capacitor C, and, for this purpose, each has an end connected to capacitor C through analog switch SW5 or SW6. The terminal voltage of capacitor C is buffered by buffer amplifier AMP, and is issued as tracking error signal TES. Capacitor C is also connected to an end of each of resistors R1 and R2. The other end of resistor R1 is always grounded, and the other end of resistor R2 is grounded through analog switch SW9.

Analog switches SW5 and SW6 are turned on/off by phase difference pulse S7 having the positive and negative polarities. More specifically, when phase difference pulse S7 is positive, switch SW5 is ON. When it is negative, switch SW6 is on. When phase difference pulse S7 is at 0 level, switches SW5 and SW6 are off.

Analog switch SW9 is supplied with signal CNG for control. When signal CNG is at level H, switch SW9 is on. When signal CNG is at level L, switch SW9 is off.

In FIG. 17A, capacitor C is charged positively and negatively by constant current sources CC1 and CC2 depending on the positive and negative of phase difference pulse S7, and is discharged through either resistor R1 or a parallel connection of resistors R1 and R2 while phase difference pulse S7 is at 0 level. The time constant of charging/discharging of capacitor C can be switched by the level of signal CNG. When signal CNG is at level H, the time constant is small. When signal CNG is at level L, the time constant is large. Calculation of pole frequency $f_{LPF}$ based on the time constant of capacitor C can be performed in the same manner as that expressed by the formulas in FIG. 15A.

Switching of the pole frequency among the three stages can be achieved by a structure in FIG. 17B. The structure in FIG. 17B differs from that in FIG. 17A in that resistor R3, an analog switch SWA and control signal CNg are additionally employed, and signals CNG and CNg are operated.

Switching of pole frequency among the more stages in all LPF can be achieved by employing more analog switches, contacts, resistors and signals of controlling switches.

Figure 18A:
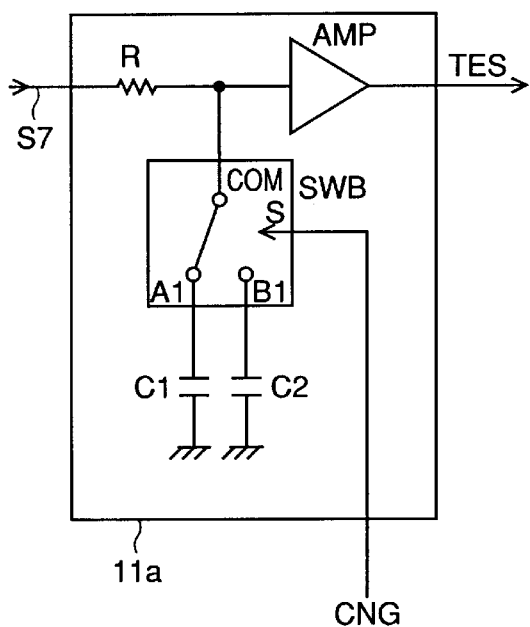
FIGS. 18A and 18B show a fifth example of the circuit structure of the LPF in FIG. 11 as well as a problem thereof.
Figure 18B:
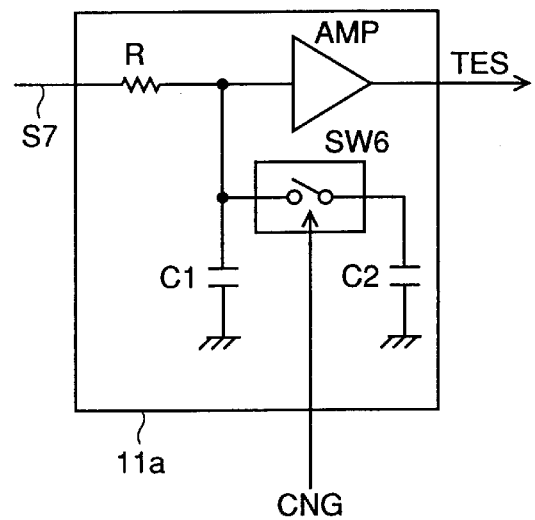

According to the first to fourth examples described above, switching of the time constant or pole frequency $f_{LPF}$ is performed by switching the resistors. However, the switching may be achieved by the fifth example of the structure which switches capacitors as shown in FIGS. 18A and 18B. LPF 11a in FIG. 18A includes resistor R, buffer amplifier AMP, analog switch SWB and capacitors C1 and C2, and is adapted to connect one of capacitors C1 and C2 to resistor R. The structure in FIG. 18B is similar to that in FIG. 18A, and is additionally adapted to connect and disconnect capacitors C1 and C2 to and from each other. In either structure, the feature that the time constant or pole frequency $f_{LPF}$ is switchable is the same as those of the first to fourth examples in which the resistance value is switched. However, the fifth example of the structure switching the capacitors may suffer from the following three disadvantages.

The first disadvantage by the switching of the capacitors is occurrence of a stepped portion at tracking error signal TES due to difference between terminal voltages of the capacitors. This stepped portion is caused by the difference between the terminal voltages of capacitors C1 and C2 at the time of switching between the capacitors in FIG. 18A or at the time of mutual connection of the capacitors in FIG. 18B. In FIG. 18A, when analog switch SWB switches the connection of capacitors, the input voltage of buffer amplifier AMP suddenly changes from the terminal voltage of one of capacitors C1 and C2 to the terminal voltage of the other. In FIG. 18B, the terminal voltages of capacitors C1 and C2 may be different from each other when capacitors C1 and C2 are connected together. In this case, electric charges move between the capacitors C1 and C2 to eliminate the difference between the terminal voltages of capacitors C1 and C2, so that the terminal voltage of capacitor C1 connected to buffer amplifier AMP suddenly changes. In either structure, it is impossible to assure that the switching or the connection is performed when both the capacitors carry the equal terminal voltages. Therefore, the stepped portion reflecting the sudden change in capacitor terminal voltage appears at tracking error signal TES. An adverse influence is temporarily applied on various operations immediately after switching of the capacitor or mutual connection of the capacitors, and more specifically is applied, for example, on a control accuracy of the tracking servo operation, determination of the number of traversed tracks in the track traversing operation, determination of the traversing direction, and detection of the midpoint between the tracks.

The second disadvantage due to switching of the capacitors is caused in the structure in FIG. 18B performing connection and disconnection between the capacitors. When analog switch SWC connects capacitors C1 and C2 together, electric charges may move to equalize the terminal voltages of capacitors C1 and C2, in which case a current flows through analog switch SWC. The maximum value of this current is equal to a quotient obtained by dividing the difference between the terminal voltages of the two capacitors by the ON resistance of analog switch SWC. Therefore, under certain conditions of the ON resistance value as well as capacities and terminal voltages of the capacitors C1 and C2, an excessively large current may flow through and therefore break switch SWC.

The third disadvantage due to the switching of the capacitors is the increase in number of leader pins and external parts required for completing LPF 11a or a device including the same as an IC. In general, a capacitor to be incorporated in an IC must have a small capacitance in the order from several to tens of picofarads. Therefore, only the capacitor cannot be incorporated in and therefore is externally attached to the IC which includes LPF 11a averaging phase difference pulse S7. According to the first to fourth examples employing the switchable resistance, only one pin is required per LPF 11a for externally attaching capacitor C and more specifically for leading an interconnection connected to buffer amplifier AMP (the other end of capacitor is grounded). The resistors can be easily incorporated into the IC. Therefore, the part to be externally attached to the IC can be only one capacitor. This is true with respect to the case wherein the time constant or pole frequency is switchable among three stages.

However, the fifth example employing the switchable capacitors, one LPF 11a requires at least two pins for connecting the capacitors. Further, for switching the time constant or pole frequency among three or more stages, leading pins which correspond in number to the switchable stages are required. For providing the fifth example by using only one leading pin, analog switches SWB and SWC must be externally attached. Since analog switches SWB and SWC are specifically formed of elements such as field-effect transistors (FETs), the switches themselves can be easily arranged in the IC. In spite of this fact, the structure employing the switchable capacitors requires the external arrangement of the analog switches, resulting in increase in cost and mount area.

Due to the above three disadvantages, it is inappropriate to employ the structure switching the capacitors for switching the time constant or pole frequency $f_{LPF}$ in LPF 11a, and it is desired to employ the structure changing the resistance for the same purpose.

Description has been given on the structures in which the time constant or pole frequency $f_{LPF}$ of LPF 11a is switched during the tracking servo operation or the track traversing operation for averaging phase difference pulse S7. The switching is based on the following conditions:

(1) If a sufficiently large phase margin is ensured, a large time constant (small pole frequency $f_{LPF}$) is employed for the tracking servo operation and the track jump for one or several tracks, and a small time constant (high pole frequency $f_{LPF}$) is employed for the track search performed by traversing many tracks.

(2) If a sufficiently large phase margin cannot be ensured, a small time constant (high pole frequency $f_{LPF}$) is employed for the tracking servo operation and the track search operation performed by traversing many tracks, and a large time constant (low pole frequency $f_{LPF}$) is employed for the track jump for one or several tracks.

(3) If possible in the above item (2), switching of the time constant of LPF 11a among three values is employed, and the time constant is set to a middle value (pole frequency $f_{LPF}$ is set to a middle value between high and low values) during the tracking servo operation.

The inventors carried out an experiment with an optical disk device for CDs or the like, and found that a disturbance at tracking error signal TES can be small when the frequency of reproduced signal RF is high even if the time constant is small (pole frequency $f_{LPF}$ is high).

More specifically, the midpoint between the tracks can be detected easily during the track jump. If it were difficult to detect the midpoint between the tracks in the track jump operation, the width of phase difference pulse S7, which is obtained from information pits 125 on the tracks at the opposite sides thereof, as well as the frequency of occurrence of the pulse would become abnormal or irregular, so that the output of integrator (or LPF) would suddenly or irregularly vary to a large extent, resulting in a disturbance at the waveform of tracking error signal TES between the tracks.

However, as the frequency of reproduced signal RF increases, the time width of phase difference pulse S7, which is obtained correspondingly to each information pit 125, becomes short and the frequency of pulse occurrence becomes high. Therefore, the irregularity in phase difference pulse S7 varies rapidly as a whole, so that even a small time constant can average the variation and can suppress the disturbance at tracking error signal TES.

The frequency of reproduced signal RF increases not only when the pit density of information pits 125 in the track lengthwise direction increases but also when the disk rotates at a higher speed as can be done, for example, by "n-fold speed reproduction" in a CD-ROM device. In the latter case, even if a defect is present at the disk, a disturbance at tracking error signal TES is reduced, because the length of time for which light spot 124 moves over the defect can be short, each time width of phase difference pulse S7 obtained from each information pit 125 is short and the frequency of pulse occurrence is high. This means that, when the disk rotation speed is high, deterioration of the control accuracy due to the defect on the disk or the like can also be suppressed in the tracking servo operation.

Therefore, when the reproduced signal RF has a high frequency, it is not necessary to switch the time constant to a large value (switch the pole frequency to a low value) in the tracking servo operation or track traversing operation. As a result, when detecting the midpoint between the tracks during the track jump, the phase lag (time lag) of tracking error signal TES caused by the integrator or LPF is reduced at least to a small extent. Thereby, the midpoint between the tracks can be detected more accurately, and the accuracy of the track jump can be further increased. In the tracking servo operation, therefore, reduction in phase margin can be prevented while suppressing significant deterioration of the control accuracy which may be caused by a defect on the disk or the like, so that the tracking servo-control can be performed more stably.

Figure 19:
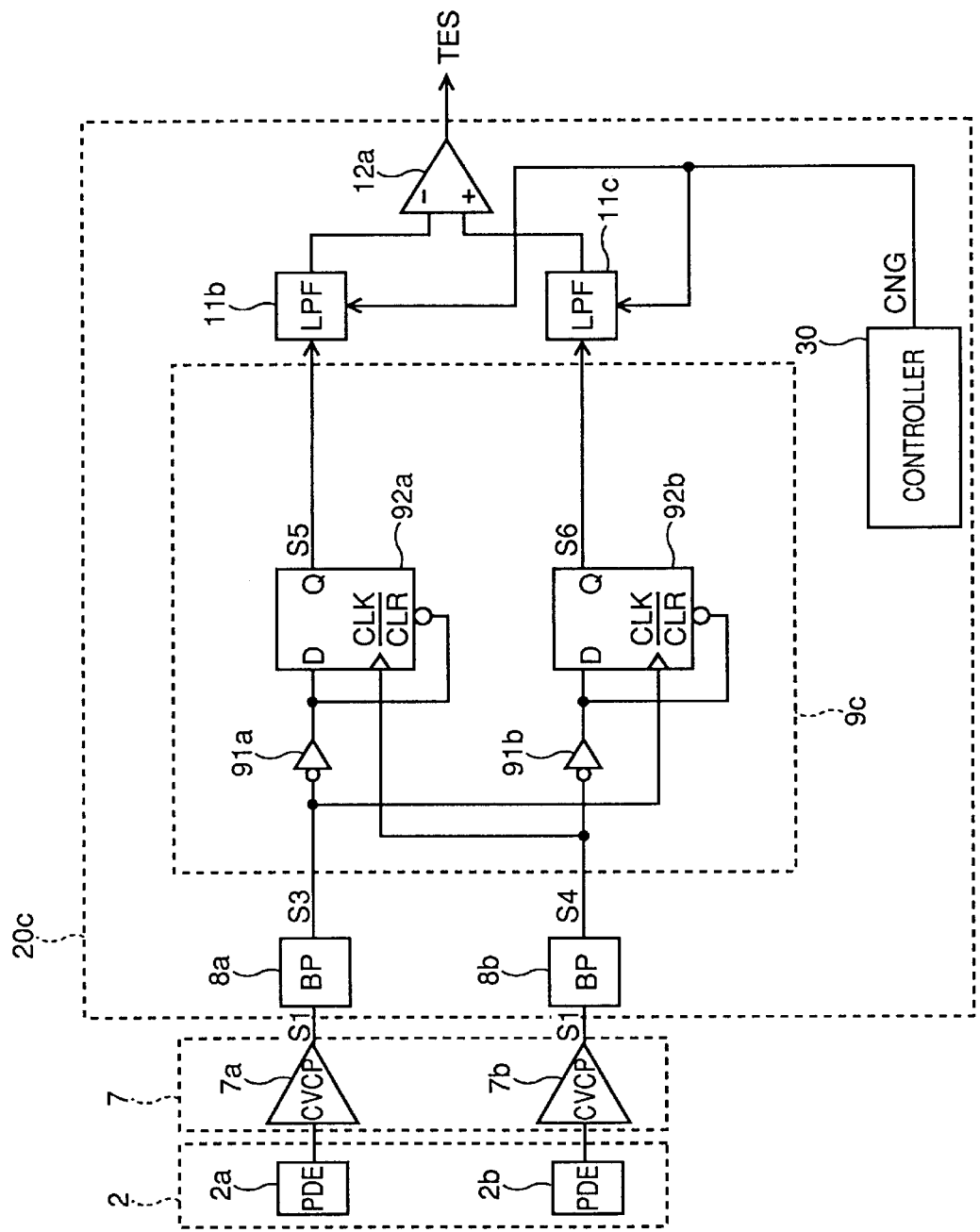
FIG. 19 shows another example of the structure of the signal processing circuit producing the tracking error signal according to the second embodiment of the invention.

FIG. 19 shows another example of the structure of the signal processing circuit for producing the tracking error signal according to the second embodiment of the invention. The circuit in FIG. 19 includes photo detector 2 including photo detector elements 2a and 2b, current-voltage converting circuit 7 including current-voltage converting portions 7a and 7b, and a signal processing circuit 20c. Signal processing circuit 20c includes binarizing circuits 8a and 8b which receive output signals S1 and S2 of converting portions 7a and 7a, and produce therefrom binary signals S3 and S4, respectively, a pulse issuing portion 9c, LPFs 11b and 11c, a differential amplifier 12a and controller 30. Pulse issuing portion 9c includes D-FFs 92a and 92b as well as NOT gates 91a and 91b.

The outputs of pulse issuing portion, i.e., output signals S5 and S6 on output terminals Q of D-FFs 92a and 92b are applied to LPFs 11b and 11c, respectively, and are applied to differential amplifier 12a after being averaged. Differential amplifier 12a obtains the difference between averaged signals S5 and S6, and issues the same as tracking error signal TES. The output signals of binarizing portions 8a and 8b, of which logical levels are inverted by NOT gates (inverters) 91a and 91b, are applied to terminals D and CLR of D-FFs 92a and 92b, respectively. Therefore, D-FFs 92a and 92b detect the phase difference (time difference) of rising edges from level L to level H of output signals S3 and S4 of binarizing portions 8a and 8b.

The circuit operation of the structure in FIG. 19 is substantially the same as that in FIG. 11 except for that the phase difference (time difference) of rising edges from level L to level H of output signals S3 and S4 of binarizing portions 8a and 8b are detected. A major difference of the operation of the circuit in FIG. 19 with respect to that in FIG. 11 is the control of LPFs 11b and 11c by controller 30. When it is determined that reproduced signal RF has a frequency higher than the predetermined value, which reduces the disturbance at tracking error signal TES, and particularly when the track jump is to be performed, controller 30 does not perform the control for switching the time constants of LPFs 11b and 11c to a large value (switching pole frequency $f_{LPF}$ to a low value), and maintains control signal CNG for LPFs 11b and 11c at level H. The control in this manner is also performed in such as case that an instruction is issued to an unillustrated portion (e.g., a spindle motor and/or a decoder for decoding reproduced signal RF) to perform reproduction with an increased rotation speed of the disk for a fast data transfer, as is performed for "n-fold speed reproduction" of the CD-ROM already described. The control in the above manner is further performed in the tracking servo operation.

In FIG. 19, phase difference pulses S5 and S6 applied to LPFs 11b and 11c are the signals on output terminals Q of D-FFs 92a and 92b, respectively, and therefore have two logical levels, i.e., level H and level L. Thus, phase difference pulses S5 and S6 do not have three levels, i.e., zero, positive and negative levels in contrast to output signal S7 of difference detector 10a in FIG. 11. However, the structures of LPF 11a shown in FIGS. 14A and 14B as well as FIGS. 15A and 15B not using the constant current source can be applied to LPFs 11b and 11c in FIG. 19.

Figure 20:
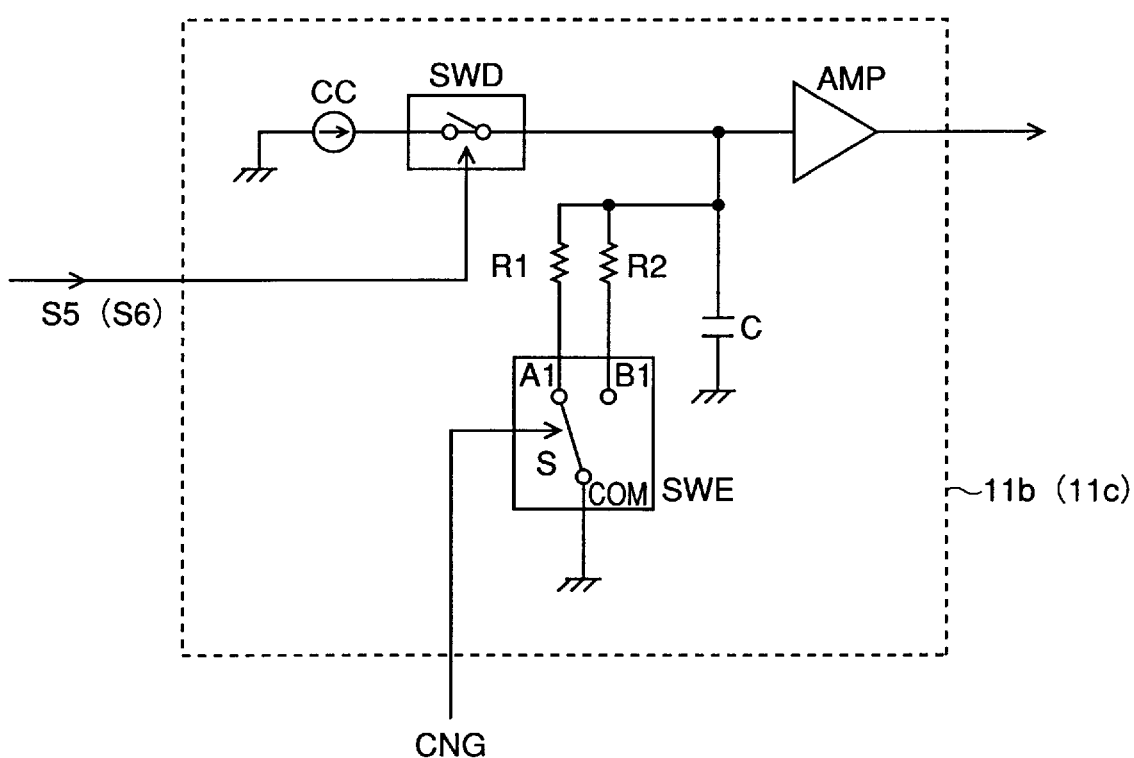
FIG. 20 shows an example of the circuit structure of the LPF in FIG. 19.
Figure 21:
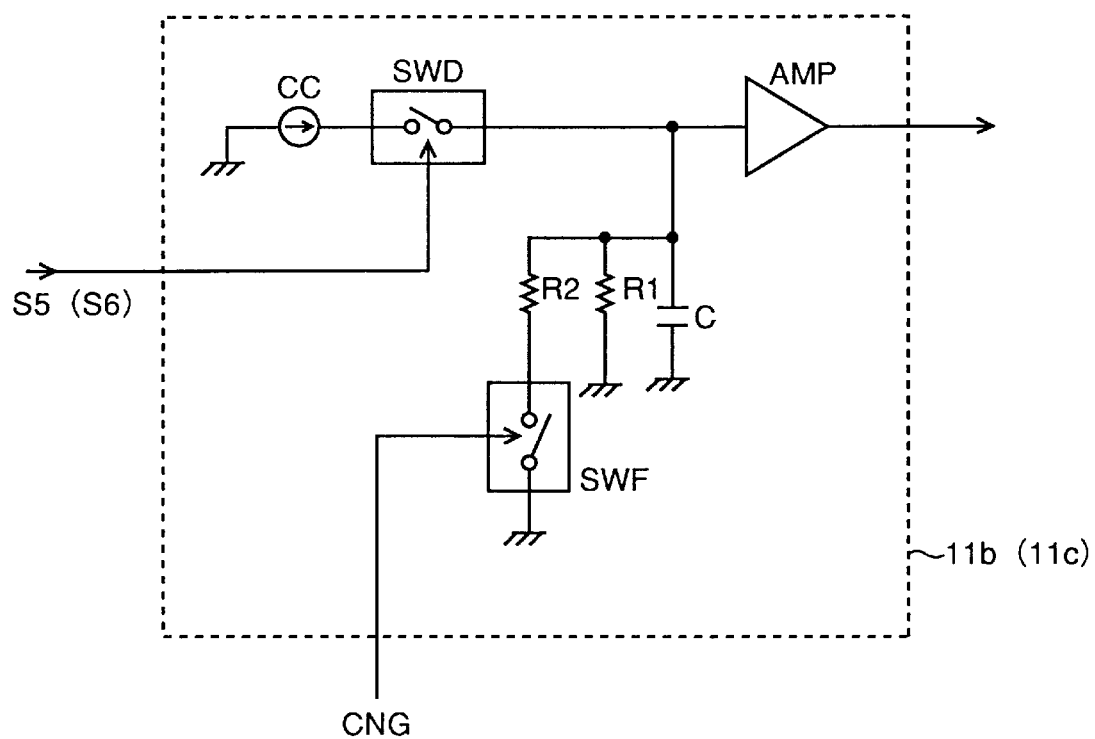
FIG. 21 shows another example of the circuit structure of the LPF in FIG. 19.
Figure 22:
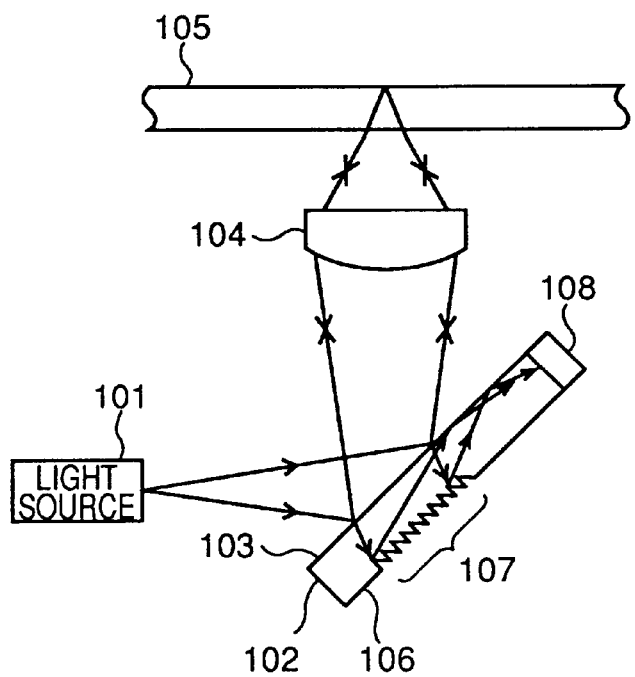
FIG. 22 schematically shows a structure of an optical pickup in the prior art.
Figure 23:
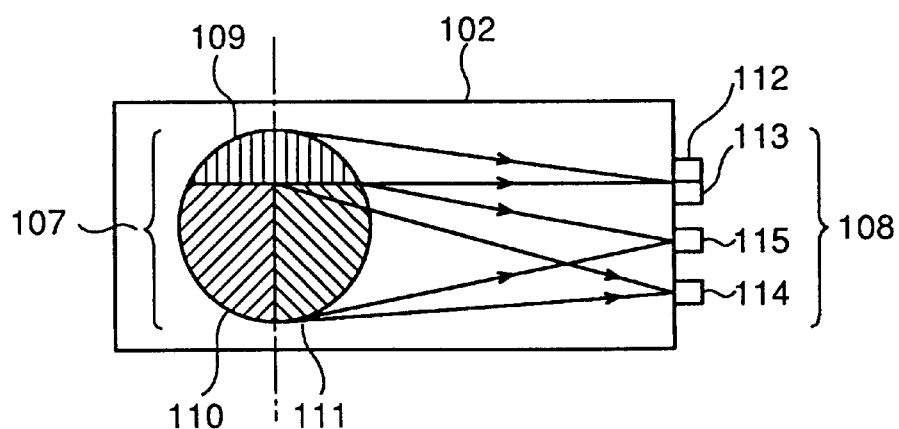
FIG. 23 shows structures of a photo detector and a grating of the optical pickup in FIG. 22.

FIGS. 20 and 21 show one and another examples of the circuit structure of the LPF in FIG. 19, respectively.

LPF 11b (11c) in FIG. 20 includes a constant current source CC, analog switches SWD and SWE, resistors R1 and R2, capacitor C and buffer amplifier AMP. Constant current source CC is connected through analog switch SWD to capacitor C having a grounded end. The terminal voltage of capacitor C is output after being buffered by buffer amplifier AMP. Capacitor C is also connected to one end of each of resistors R1 and R2, of which other ends are selectively grounded by analog switch SWE.

ON/OFF of analog switch SWD is controlled by phase difference pulse S5 (S6). More specifically, switch SWD is on when phase difference pulse S5 (S6) is at level H, and is off when at level L.

Analog switch SWE receives signal CNG for controlling the switching thereof. Capacitor C is discharged through resistor R1 when signal CNG is at level H, and is discharged through resistor R2 when it is at level L.

In the structure shown in FIG. 20, while phase difference pulse S5 (S6) is at level H, constant current source CC charges capacitor C. While it is at level L, capacitor C is discharged through either of resistors R1 and R2. The time constant for the charging and discharging of the capacitor can be switched in accordance with the level of signal CNG. For example, when the resistance exhibit a relation of R1<R2, the time constant is switched to a small value in accordance with level H of signal CNG, and is switched to a large value in accordance with level L of the same. The time constant can be calculated in the same manner as that expressed by formulas (1) and (2) related to the circuit structures shown in FIGS. 16A and 16B.

LPF 11b (11c) in FIG. 21 has the same structure as that in FIG. 20 except for that switch SWE is replaced with switch SWF. In FIG. 21, constant current source CC is connected through analog switch SWD to capacitor C having a grounded end. The terminal voltage of capacitor C is buffered by buffer amplifier AMP and is output. Capacitor C is also connected to one end of each of resistors R1 and R2. The other end of resistor R1 is always grounded. The other end of resistor R2 is grounded through analog switch SWF.

Analog switch SWD is turned on/off by phase difference pulse S5 (S6). More specifically, analog switch SWD is on when phase difference pulse S5 (S6) is at level H, and is off when it is at level L.

Analog switch SWF is supplied with signal CNG for controlling the switching, and is turned on when signal CNG is at level H. When signal CNG is at level L, the switch SWF is turned off.

In FIG. 21, capacitor C is charged by constant current source CC while phase difference pulse S5 (S6) is at level H, and is discharged through either resistor R1 or the parallel connection of resistors R1 and R2 while the phase difference pulse S5 (S6) is at level L. The time constant for charging and discharging of capacitor C can be switched in accordance with the level of signal CNG. When signal CNG is at level H, the time constant is small. When signal CNG is at level L, the time constant is large. The time constant can be calculated in the same manner as that expressed by the formulas (3) and (4) in FIGS. 17A and 17B.

In this embodiment, the frequency of reproduced signal RF is determined based on the level of signal CNG issued from controller 30, and thereby the time constant of the LPF is switched. Alternatively, the frequency of signal RF which is actually reproduced may be measured, and the time constant can be switched based on the measured value.

The optical pickup applied to the invention is not restricted to the structure in FIG. 2, which has the hologram (diffraction grating) divided into three regions, uses two photo detector elements for detecting tracking error signal TES, and uses the Foucault method for detection of the focus error signal, and may have the structure shown in FIGS. 9 and 10.

The pulse issuing portion of this embodiment may be replaced with the pulse issuing portion of the first embodiment, in which case the effects achieved by the first and second embodiments can be likewise achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tracking control device for an optical pickup, wherein, for reproducing information from a disk carrying said information recorded on a plurality of tracks, a light spot is radiated to the predetermined track, light beam reflected from said predetermined track is received on regions divided at least in a tracking direction, and two electrical signals corresponding to quantities of received light beams on the divided regions are issued, respectively, said tracking control device comprising:

pulse producing means for binarizing said two electrical signals issued from said optical pickup to form two binary signals, and issuing two-phase pulses each having a time width starting from the time point of change in one of said two binary signals from a first level to a second level and terminating at earlier one between the time point of return of said one binary signal to said first level and the time point of change in the other binary signal from said first level to said second level, said two-phase pulses being issued depending on the binary signal between said two binary signals completing earlier change from said first level to said second level;

error signal producing means for producing a tracking error signal indicating a relative position between said predetermined track and said light spot based on said two-phase pulses issued from said pulse producing means; and drive means for driving said optical pickup to move said light spot in said tracking direction based on said tracking error signal produced by said error signal producing means and thereby performing a tracking servo operation or a track traversing operation by said optical spot.

2. The tracking control device for the optical pickup according to claim 1, wherein said pulse producing means includes first and second D-type flip-flops;

said one binary signal is applied to said first D-type flip-flop, and is output therefrom in response to a first clock input of said first D-type flip-flop formed by inverting said other binary signal, said other binary signal is applied to said second D-type flip-flop, and is output therefrom in response to a second clock input of said second D-type flip-flop formed by inverting said one binary signal, a first logical product of the output of said first D-type flip-flop and said first clock input as well as a second logical product of the output of said second D-type flip-flop and said second clock input are obtained, and said first and second logical products are issued as said two-phase pulses.

3. The tracking control device for the optical pickup according to claim 2, wherein said pulse producing means includes first and second AND gates for obtaining said first and second logical products;

said first and second AND gates each have three or more inputs, and at least one of said three or more inputs is supplied with a signal for controlling the output of the corresponding pulse between said two-phase pulses.

4. The tracking control device for the optical pickup according to claim 1, wherein said pulse producing means includes first and second D-type flip-flops;

said one binary signal is inverted and applied to said first D-type flip-flop, and is output therefrom in response to a first clock input of said first D-type flip-flop formed of said other binary signal, said other binary signal is inverted and applied to said second D-type flip-flop, and is output therefrom in response to a second clock input of said second D-type flip-flop formed of said one binary signal, a first logical product of the output of said first D-type flip-flop and said other binary signal as well as a second logical product of the output of said second D-type flip-flop and said one binary signal are obtained, and said first and second logical products are issued as said two-phase pulses.

5. The tracking control device for the optical pickup according to claim 4, wherein said pulse producing means includes first and second AND gates for obtaining said first and second logical products;

said first and second AND gates each have three or more inputs, and at least one of said three or more inputs is supplied with a signal for controlling the output of the corresponding pulse between said two-phase pulses.

6. A tracking control device for an optical pickup, wherein, for reproducing information from a disk carrying said information recorded on a plurality of tracks, a light spot is radiated to the predetermined track, light beam reflected from said predetermined track is received on regions divided at least in a tracking direction, and two electrical signals corresponding to quantities of received light beams on the divided regions are issued, respectively, said tracking control device comprising:

pulse producing means for binarizing said two electric signals issued from said optical pickup to form binary signals, respectively, and issuing two-phase pulses based on relative time differences of the respective binary signals;

error signal producing means using low-pass means having a plurality of switchable different time constants for producing a tracking error signal indicative of a relative position between said predetermined track and said light spot based on said two-phase pulses issued from said pulse producing means;

drive means for driving said optical pickup based on said tracking error signal produced by said error signal producing means to move said light spot in said tracking direction and thereby to perform a tracking servo operation or a track traversing operation by said light spot; and time constant setting means for selecting and setting in said low-pass means the time constant among said plurality of time constants corresponding to the operation of said optical pickup driven by said drive means.

7. The tracking control device for the optical pickup according to claim 6, wherein said time constant setting means selects the time constant corresponding to the number of the traversed tracks by said light spot in said track traversing operation among said plurality of switchable different time constants.

8. The tracking control device for the optical pickup according to claim 6, wherein said time constant setting means selects the time constant corresponding to a frequency of a signal representing said information reproduced from said disk among said plurality of switchable different time constants.

9. The tracking control device for the optical pickup according to claim 7, wherein said time constant setting means selects the time constant corresponding to a frequency of a signal representing said information reproduced from said disk among said plurality of time constants.

10. The tracking control device for the optical pickup according to claim 7, wherein said plurality of time constants includes two different time constants;

said time constant setting means selects the larger one between said two different time constants in said tracking servo operation and in said track traversing operation with said number of the traversed tracks equal to or smaller in number than a predetermined value; and said time constant setting means selects the smaller one between said two different time constants in said track traversing operation with said number of the traversed tracks larger than said predetermined value.

11. The tracking control device for the optical pickup according to claim 7, wherein said plurality of switchable different time constants includes two different time constants;

said time constant setting means selects the larger one between said two different time constants in said track traversing operation with said number of the tranversed tracks equal to or smaller than a predetermined value; and said time constant setting means selects the smaller one between said two different time constants in said tracking servo operation and in said track traversing operation with said number of the traversed tracks larger than said predetermined value.

12. The tracking control device for the optical pickup according to claim 7, wherein said plurality of switchable different time constants includes three different time constants;

said time constant setting means selects the largest one among said three different time constants in said track traversing operation with said number of the traversed tracks equal to or smaller than a predetermined value;

said time constant setting means selects the smallest one among said three different time constants in said track traversing operation with said number of the traversed tracks larger than said predetermined value; and said time constant setting means selects another time constant among said three different time constants in said tracking servo operation.

13. The tracking control device for the optical pickup according to claim 6, wherein said low-pass means includes a plurality of resistors for determining said plurality of switchable different time constants, and said time constant setting means selects said time constant by changing a composite resistance value of said plurality of resistors.

14. A tracking control device for an optical pickup, wherein, for reproducing information from a disk carrying said information recorded on a plurality of tracks, a light spot is radiated to the predetermined track, light beam reflected from said predetermined track is received on regions divided at least in a tracking direction, and two electrical signals corresponding to quantities of received light beams on the divided regions are issued, respectively, said tracking control device comprising:

pulse producing means for binarizing said two electrical signals issued from said optical pickup to form two binary signals, and issuing two-phase pulses each having a time width starting from the time point of change in one of said two binary signals from a first level to a second level and terminating at earlier one between the time point of return of said one binary signal to said first level and the time point of change in the other binary signal from said first level to said second level, said two-phase pulses being issued depending on the binary signal between said two binary signals completing earlier change from said first level to said second level;

error signal producing means using low-pass means having a plurality of switchable different time constants for producing a tracking error signal indicative of a relative position between said predetermined track and said light spot based on said two-phase pulses issued from said pulse producing means;

drive means for driving said optical pickup based on said tracking error signal produced by said error signal producing means to move said light spot in said tracking direction and thereby to perform a tracking servo operation or a track traversing operation by said light spot; and time constant setting means for selecting and setting in said low-pass means the time constant among said plurality of switchable different time constants corresponding to the operation of said optical pickup driven by said drive means.

* * * * *